US012749504B1

(12) United States Patent
Guo et al.

(10) Patent No.: US 12,749,504 B1
(45) Date of Patent: Sep. 29, 2026

(54) BURST PATTERN TRACK-TO-TRACK PHASE ADJUSTMENT IN A DATA STORAGE DEVICE

(71) Applicant: Western Digital Technologies, Inc., San Jose, CA (US)

(72) Inventors: Guoxiao Guo, Irvine, CA (US); Tianyu Jiang, San Jose, CA (US); Charles A. Park, Aromas, CA (US); Scott A. Ottele, Longmont, CO (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 19/089,137

(22) Filed: Mar. 25, 2025

(51) Int. Cl.
*G11B 5/596* (2006.01)

(52) U.S. Cl.
CPC ...... *G11B 5/59688* (2013.01); *G11B 5/59627* (2013.01); *G11B 5/59666* (2013.01)

(58) Field of Classification Search
None
See application file for complete search history.

(56) References Cited

U.S. PATENT DOCUMENTS 5,585,976 A * 12/1996 Pham ................. G11B 5/59627 360/77.04
6,049,440 A * 4/2000 Shu .................... G11B 5/59633
6,490,111 B1 * 12/2002 Sacks ................. G11B 5/59633 360/75
7,009,802 B1 * 3/2006 Ehrlich .............. G11B 5/59666 360/75
7,110,209 B2 9/2006 Ehrlich
7,333,290 B1 2/2008 Kupferman
8,031,427 B2 10/2011 Kim
8,295,002 B1 * 10/2012 Katchmart ......... G11B 5/59688 360/48
8,531,798 B1 * 9/2013 Xi ...................... G11B 5/59627 360/78.04
9,979,573 B1 * 5/2018 Marrow .................. H04L 27/22
11,200,912 B1 12/2021 Guo
12,100,431 B1 9/2024 Guo (Continued)

FOREIGN PATENT DOCUMENTS

JP 2010146603 A 7/2010

OTHER PUBLICATIONS

Ma, K., "Servo Pattern Enhancements for High Areal Density Hard Disk Drives", Doctoral thesis, Nanyang Technological University, Singapore. Ma, K. (2017).

*Primary Examiner* — Peter Vincent Agustin
(74) *Attorney, Agent, or Firm* — Patent Law Works LLP

(57) ABSTRACT

Example storage medium servo patterns, data storage devices, and methods to provide position error burst pattern track-to-track phase adjustment relative to other servo data in the servo sector are described. The data storage device may include storage media, such as magnetic disks, having servo sectors that define servo tracks, where each servo sector has a first portions, such as a preamble, servo address mark, and Gray code, and a set of position error bursts, where the position error bursts are written with a phase offset relative first portion. For example, a first burst in the set of position error bursts may be shifted by a phase offset value in one direction and a second burst may be shifted in the opposite direction and the shifts may vary from track-to-track in direction and phase offset value.

23 Claims, 11 Drawing Sheets

(56) References Cited

U.S. PATENT DOCUMENTS

| | | | | |
|---|---|---|---|---|
| 2002/0109933 | A1* | 8/2002 | Ashikaga | G11B 5/59627 360/48 |
| 2004/0125497 | A1* | 7/2004 | Schmidt | G11B 19/04 |
| 2007/0279786 | A1 | 12/2007 | Ehrlich | |
| 2009/0316295 | A1* | 12/2009 | Kim | G11B 5/59644 360/76 |

* cited by examiner

BURST PATTERN TRACK-TO-TRACK PHASE ADJUSTMENT IN A DATA STORAGE DEVICE

TECHNICAL FIELD

The present disclosure relates to servo control for data storage devices. In particular, the present disclosure relates to using servo patterns with burst patterns written at different phases relative to the preamble.

BACKGROUND

Data storage devices such as hard disk drives comprise a magnetic disk and a head connected to a distal end of an actuator arm which is rotated about a pivot by a voice coil motor (VCM) to position the head radially over the disk. The disk comprises a plurality of radially spaced tracks for recording user data sectors and servo sectors. In some configurations, referred to as concentric track, the radially spaced data tracks comprise concentric rings with starting and ending positions in the same ring, sometimes including one or more parity sectors at the end of the track. In some configurations, referred to as spiral track, the radially spaced data tracks comprise at least one continuous spiral comprising multiple data tracks and multiple revolutions of the disk, with track starting and ending positions at selected points along the spiral. The servo sectors comprise head positioning information (e.g., a track address) which is read by the head and processed by a servo control system to control the actuator arm as it seeks from track to track. The magnetic disk acts as a non-volatile storage medium for storing data.

The prior art disk format of FIG. 1A also comprises a number of servo sectors $\mathbf{6}_0$-$\mathbf{6}_N$ recorded around the circumference of the disk 2 that define a plurality of servo tracks, wherein the data tracks 4 are defined relative to the servo tracks. Each servo sector $\mathbf{6}_i$ may comprise a preamble 8 for storing a periodic pattern, which allows proper gain adjustment and timing synchronization of the read signal, and a sync mark 10, sometimes referred to as a servo address mark, for storing a special pattern used to symbol synchronize to a servo data field 12. The servo data field 12 stores coarse head positioning information, such as a track address, used to position the head over a target data track during a seek operation. Each servo sector $\mathbf{6}_i$ may further comprise groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking based on position error signals while accessing a data track during write/read operations.

To facilitate demodulating the servo sectors $\mathbf{6}_0$-$\mathbf{6}_N$, a timing control loop generates a disk locked clock synchronized to the data rate of the servo sectors $\mathbf{6}_0$-$\mathbf{6}_N$. The disk locked clock generates suitable timing information, such as a servo gate that times the circumferential location of the servo sectors $\mathbf{6}_0$-$\mathbf{6}_N$, and a synchronization (sync) window that times the circumferential location of the sync marks 10 within the servo sectors $\mathbf{6}_0$-$\mathbf{6}_N$ as shown in FIG. 1B. Proper synchronization enables the processing of servo data 12 and servo bursts 14 following sync mark 10. Synchronization may include frequency, phase, and data start synchronization to establish timing of servo data.

There is a general desire to maximize the signal-to-noise ratio (SNR) provided by servo patterns read from the storage medium to provide improved performance, format efficiency, and margining. During servo write operations, servo sector data, including preamble, synchronization marks, and servo address data, are generally written with the same phase across each servo sector and the circumference of the track. The servo bursts (A and B 108) are written as in-phase or out-of-phase relative to the preamble, and the servo preamble also has the same frequency in the same servo zone. Put it in other words, phase relationship between burst and preamble/servo address mark (SAM) does not change within each servo sector. In some configurations, the servo pattern, including the bursts, may be written in half-track increments that result in stitched bursts that are written across multiple adjacent half-track passes. Small variations in the phase alignment of these stitched bursts from track to track and within each servo sector may result in a lower SNR and higher repeatable run out (RRO) when determining the position error signal from the bursts than could be achieved through improved alignment.

There is a need for technology that improves the alignment of stitched bursts in the set of position error bursts in each servo sector through controlling small phase shifts during servo write operations for positioning each burst relative to the preceding servo data and other bursts in the burst pattern.

SUMMARY

Various aspects for data storage devices with servo sectors having position error burst track-to-track phase adjustments are described, particularly servo sectors with sets of servo bursts written with phase offset values relative to the nominal phase of the preceding portion of the servo sector data.

One general aspect includes a data storage device that includes a storage medium that includes a plurality of angularly spaced servo sectors defining a plurality of servo tracks and corresponding data sectors between consecutive servo sectors, where each servo sector is comprised of servo patterns corresponding to different servo tracks and may include: a first portion written with a first phase; and a set of position error bursts written with at least one second phase that is offset from the first phase by a phase offset value.

Implementations may include one or more of the following features. The set of position error bursts may include a first burst and a second burst, the first burst may be offset from the first phase in a first direction by the phase offset value, and the second burst may be offset from the first phase in an opposite direction by the phase offset value. The first portion and the set of position error bursts may be written in multiple passes for each servo track of the plurality of servo tracks, a burst pattern of the first burst and the second burst may change across each adjacent pass of the multiple passes, and the first direction and the opposite direction alternate across each adjacent pass of the multiple passes. The burst pattern may include at least one stitched burst across each adjacent pass of the multiple passes, and a relative offset of bursts contributing to the at least one stitched burst align the at least one stitched burst to increase signal-to-noise ratio during readback for the at least one stitched burst relative to the set of position error bursts written at the first phase. The phase offset value may be a fractional offset of a cycle time of the servo pattern that is less than half of the cycle time. The data storage device may include control circuitry configured to: determine the first phase; determine the phase offset value; generate write signal data for the first portion at the first phase; generate write signal data for at least one burst of the set of position error bursts using the phase offset value; and send combined write signal data for the first portion and the set of position error bursts to a write circuit to write the servo pattern to the storage medium. The data storage device may include control circuitry configured to: determine the first phase based on a nominal clock signal from a first phase locked clock; determine the phase offset value; interpolate, for a first burst in the set of position error bursts, a delayed clock signal from the nominal clock signal with the phase offset value in a first direction; interpolate, for a second burst in the set of position error bursts, an accelerated clock signal from the nominal clock signal with the phase offset value in an opposite direction to the first direction; and send, to a write circuit to write the servo pattern to the storage medium, write signal data for the first portion based on the nominal clock signal, the first burst based on the delayed clock signal, and the second burst based on the accelerated clock signal. The data storage device may include control circuitry configured to: determine the first phase based on a nominal clock signal from a first phase locked clock; determine the phase offset value; determine, for a first burst in the set of position error bursts, a delayed clock signal from a second phase locked clock configured to operate based on a phase shift equal to the phase offset value in a first direction; determine, for a second burst in the set of position error bursts, an accelerated clock signal from a third phase locked clock configured to operate based on a phase shift equal to the phase offset value in an opposite direction to the first direction; and send, to a write circuit to write the servo pattern to the storage medium, write signal data for the first portion based on the nominal clock signal, the first burst based on the delayed clock signal, and the second burst based on the accelerated clock signal. The data storage device may include control circuitry configured to, during servo write operations, selectively apply the phase offset value to each burst in the set of position error bursts, where the control circuitry is configured for: a range of phase offset values up to 1/16 of a cycle time of a write frequency for the servo sector; and an increment of phase offset values less than 1/128 of the cycle time. The data storage device may include: a head actuated over the storage medium for reading the plurality of angularly spaced servo sectors to generate a servo read signal; and control circuitry configured to position, responsive to the servo read signal, the head over the storage medium, where the control circuitry is configured with a plurality of phase offset values that vary across the plurality of servo tracks and the phase offset value for a selected servo track corresponds to a radial position of the selected servo track.

Another general aspect includes a method that includes actuating, by a data storage device, a head over a storage medium for reading a plurality of servo tracks, where: the storage medium may include a plurality of angularly spaced servo sectors defining the plurality of servo tracks and corresponding data sectors between consecutive servo sectors; and each servo sector is comprised of servo patterns corresponding to different servo tracks and may include a first portion written with a first phase and a set of position error bursts written with at least one second phase that is offset from the first phase by a phase offset value. The method also includes: reading, by the data storage device, the plurality of angularly spaced servo sectors; determining, by the data storage device and based on a read signal from the set of position error bursts, a position error signal; and positioning, by the data storage device, the head based on the position error signal.

Implementations may include one or more of the following features. The set of position error bursts may include a first burst and a second burst, the first burst may be offset from the first phase in a first direction by the phase offset value, and the second burst is offset from the first phase in an opposite direction by the phase offset value. The first portion and the set of position error bursts may be written in multiple passes for each servo track of the plurality of servo tracks, a burst pattern of the first burst and the second burst may change across each adjacent pass of the multiple passes, and the first direction and the opposite direction may alternate across each adjacent pass of the multiple passes. The burst pattern may include at least one stitched burst across each adjacent pass of the multiple passes, and a relative offset of bursts may contribute to the at least one stitched burst to align the at least one stitched burst to increase signal-to-noise ratio during readback for the at least one stitched burst relative to the set of position error bursts written at the first phase. The method may include, during servo write operations: determining, by the data storage device, the first phase; determining, by the data storage device, the phase offset value; generating, by the data storage device, write signal data for the first portion at the first phase; generating, by the data storage device, write signal data for at least one burst of the set of position error bursts using the phase offset value; and sending, by the data storage device, combined write signal data for the first portion and the set of position error bursts to a write circuit to write the servo pattern to the storage medium. The method may include, during servo write operations: determining, by the data storage device, the first phase based on a nominal clock signal from a first phase locked clock; determining, by the data storage device, the phase offset value; interpolating, by the data storage device and for a first burst in the set of position error bursts, a delayed clock signal from the nominal clock signal with the phase offset value in a first direction; interpolating, by the data storage device and for a second burst in the set of position error bursts, an accelerated clock signal from the nominal clock signal with the phase offset value in an opposite direction to the first direction; and sending, by the data storage device and to a write circuit to write the servo pattern to the storage medium, write signal data for the first portion based on the nominal clock signal, the first burst based on the delayed clock signal, and the second burst based on the accelerated clock signal. The method may include, during servo write operations: determining, by the data storage device, the first phase based on a nominal clock signal from a first phase locked clock; determining, by the data storage device, the phase offset value; determining, by the data storage device and for a first burst in the set of position error bursts, a delayed clock signal from a second phase locked clock configured to operate based on a phase shift equal to the phase offset value in a first direction; determining, by the data storage device and for a second burst in the set of position error bursts, an accelerated clock signal from a third phase locked clock configured to operate based on a phase shift equal to the phase offset value in an opposite direction to the first direction; and sending, by the data storage device and to a write circuit to write the servo pattern to the storage medium, write signal data for the first portion based on the nominal clock signal, the first burst based on the delayed clock signal, and the second burst based on the accelerated clock signal. The method may include, during servo write operations, selectively applying, by the data storage device, the phase offset value to each burst in the set of position error bursts, where the control circuitry of the data storage device is configured for a range of phase offset values up to 1/16 of a cycle time of a write frequency for the servo sector and an increment of phase offset values less than 1/128 of the cycle time. The method may include: calibrating a plurality of phase offset values that vary across the plurality of servo tracks based on a reader to writer offset, a radial position of a selected servo track, and a target signal-to-noise ratio value; determining, by the data storage device, the phase offset value for the selected servo track from the plurality of phase offset values based on the radial position of the selected servo track; and writing, by the data storage device, the plurality of angularly spaced servo sectors for the selected servo track using the determined phase offset value for the set of position error bursts.

Still another general aspect includes a data storage device that includes: a storage medium; a head actuated over the storage medium for reading and writing data on the storage medium; and means for controlling the head to write a plurality of angularly spaced servo sectors defining a plurality of servo tracks and corresponding data sectors between consecutive servo sectors, where each servo sector is comprised of servo patterns corresponding to different servo tracks and may include a first portion written with a first phase and a set of position error bursts written with at least one second phase that is offset from the first phase by a phase offset value.

The present disclosure describes various aspects of innovative technology capable of improving servo performance and related capacity and/or reliability gains. The various embodiments include operations and control circuitry to overcome or at least reduce issues previously encountered in data storage devices and, accordingly, are more efficient, reliable, and/or higher performance than other data storage devices. That is, the various embodiments disclosed herein include hardware and/or software with functionality to improve data storage servo performance, such as by increasing the SNR of servo bursts by adjusting track-to-track phase at which those bursts are written. Accordingly, the embodiments disclosed herein provide various improvements to data storage devices and computing systems incorporating such data storage devices.

BRIEF DESCRIPTION OF THE DRAWINGS

The techniques introduced herein are illustrated by way of example, and not by way of limitation, in the figures of the accompanying drawings in which like reference numerals are used to refer to similar elements.

DETAILED DESCRIPTION

The present disclosure relates to data storage devices and methods for improving servo pattern writing and readback in such devices. In particular, the disclosure describes techniques for implementing burst pattern track-to-track phase adjustment to enhance servo performance and positioning accuracy.

In some embodiments, a data storage device may comprise a storage medium for storing data. The storage medium may include a magnetic disk or other suitable data storage technology. The data storage device may further include a head that is actuated over the storage medium for reading and writing data. For example, the head may be a magnetic read/write head actuated over the storage medium in a hard disk drive.

The data storage device may also include control circuitry or other means for controlling the head to write servo information on the storage medium. In some embodiments, this servo information may comprise a plurality of angularly spaced servo sectors that define a plurality of servo tracks on the storage medium. The servo sectors may be interspersed between data sectors where user data is stored.

One aspect of the disclosed technology relates to how the servo sectors are written. In some configurations, each servo sector may include multiple components written with different phase relationships. For example, a first portion of the servo sector may be written with a nominal phase, while position error bursts may be written with one or more phase offsets relative to the nominal phase.

This phase-adjusted writing of servo bursts may provide several potential benefits. For example, it may allow for improved signal-to-noise ratio during readback of the servo information. The phase adjustments may also enable more precise head positioning by enhancing the accuracy of the position error signal generated from the servo bursts.

In some embodiments, the phase offsets used for writing the servo bursts may be calibrated and optimized based on various factors. For example, the offsets may be tailored to the radial position on the disk, the reader-to-writer offset of the head, or other parameters of the storage device. This calibration process may further improve servo performance across the entire storage medium.

The disclosed techniques for servo writing with phase adjustment may be applicable to a variety of data storage technologies. While particularly well-suited for hard disk drives, similar concepts could potentially be applied to other storage devices that utilize servo-based positioning systems.

The specific implementation details may vary based on the particular storage technology and device architecture.

Figure 2A:
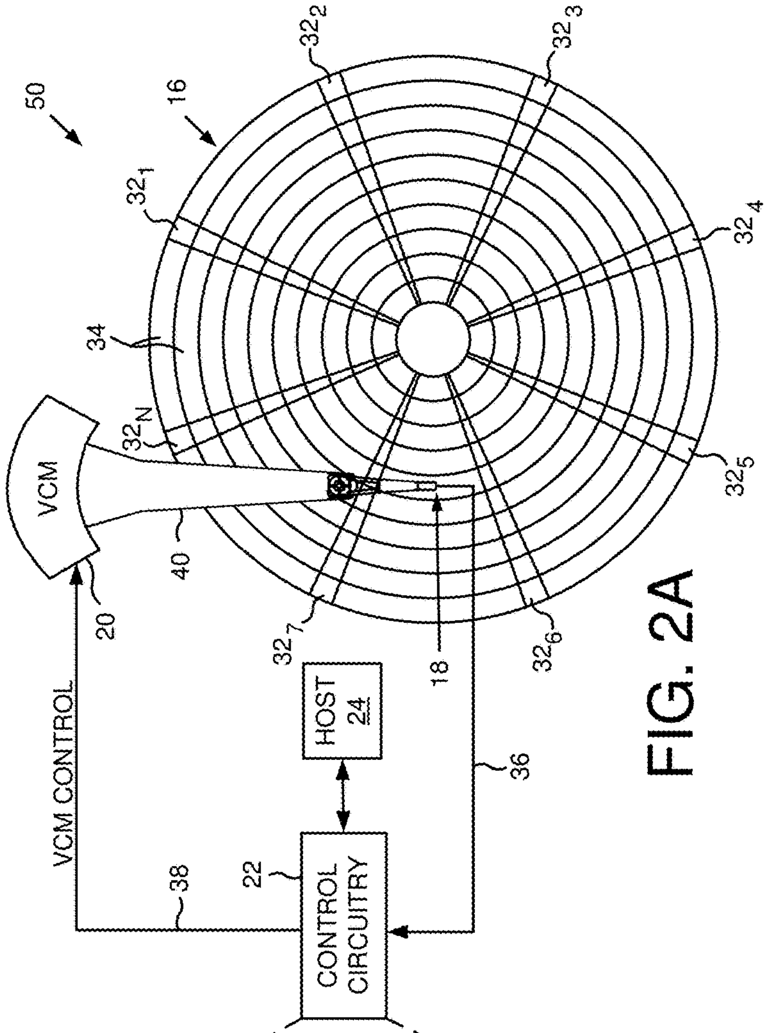
FIG. 2A is a diagram of a data storage device in the form of a disk drive comprising a head actuated over a disk surface written with servo sectors with multiple servo address marks.
Figure 2B:
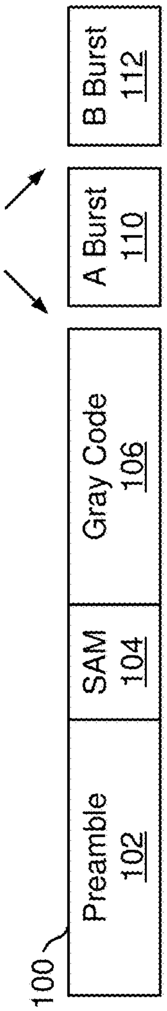
FIG. 2B is a diagram of an example servo sector format with phase shifts between servo bursts and the preceding portion of the servo data.

FIG. 2A shows a disk drive 50 comprising a disk 16 comprising a plurality of servo sectors $\mathbf{32}_1$-$\mathbf{32}_N$ defining a plurality of servo tracks 34. FIG. 2B shows an example servo sector format 100 that includes a portion of the servo data stored at nominal phase, such as preamble 102, SAM 104, and Gray code 106, and a set of servo bursts 110 and 112 that are phase adjusted 108 before each servo burst. A head 18 is actuated radially over the disk 16, and control circuitry 22 is operable to execute the flow diagram of FIG. 2C for writing servo sector format 100 during servo writing operations.

In FIG. 2A, the control circuitry 22 processes a read signal 36 emanating from the head 18 to demodulate the servo sectors $\mathbf{32}_1$-$\mathbf{32}_N$ and generate a position error signal (PES) representing an error between the actual position of the head and a target position relative to a target track in a track follow operation. Control circuitry 22 filters the PES using suitable compensation filters to generate a control signal 38 applied to a voice coil motor (VCM) 20 which rotates an actuator arm 40 about a pivot, thereby actuating head 18 radially over the disk 16 in a direction that reduces the PES. Servo sectors $\mathbf{32}_1$-$\mathbf{32}_N$ may comprise any suitable position information, such as a track and wedge address for coarse positioning and servo bursts for fine positioning. Control circuitry 22 may further read and write data to the data sectors between servo sectors $\mathbf{32}_1$-$\mathbf{32}_N$ and may interface with a host system 24 to provide data storage and retrieval for that system. In some configurations, control circuitry 22 may be configured for servo write operations, such as self-servo write, where disk drive 50 may start from an erased storage medium, write a set of reference spirals, and then use positioning feedback from the reference spirals to write servo sectors 32 to the storage medium. During the servo write operation, control circuitry 22 may use the write circuit in head 18 to writes servo sector format 100 to each servo sectors 32 for each servo track 34.

In FIG. 2B, servo sector format 100 may correspond to the servo sector fields of a servo pattern repeated for each servo sector $\mathbf{32}_1$-$\mathbf{32}_N$ of each servo track 34. The fields of servo sector format 100 are shown in a down track direction from left to right such that, when head 18 passes over a servo sector (or, more accurately, the servo sector moves past the head in accordance with the spin of disk 16), the resulting read signal 36 includes preamble 102, followed by SAM 104, followed by Gray code 106, followed by A burst 110, followed by B burst 112. In some configurations, each field corresponds to a predetermined field length of symbols or bits written to the storage medium during a servo write process. Each field corresponds to a sequential series of symbol values of the field length that are distinct from the adjacent fields and may be processed through different logic in accordance with that field's function. In some configurations, servo sector format 100 may include additional fields such as a compensation value for repeatable runout. The portion of fields in servo sector format 100 that include preamble 102, SAM 104, and Gray code 106 may be referred to as servo track data since they are ideally uniform values across the track width (distinct from the half-track skewed values of servo bursts 110, 112, as will be shown later) and provide the synchronization and gross position information for seeking to a target track.

Preamble 102 may include a repeating tone pattern, such as a 2T or 3T pattern of repeating symbols, that may provide an initial signal for the sector to facilitate gain adjustment and frequency timing for sampling the read signal. For example, preamble 102 may include large number of cycles relative to the other fields in the series, such as 30 or more cycles of repeating tone symbols, that lower the accuracy requirements for an initial servo gate and provide for reliable adjustment of gain and channel timing lock.

SAM 104 may be a servo address mark field used for synchronization of symbol timing for reading other portions of the servo sector, such as Gray code 106 and servo bursts 110 and 112. In some configurations, SAM values may also be used to assist with timing information for write and read operations in the following data sector.

Gray code 106 is an example track identifier. Track identifiers may encode coarse track and sector information for identifying the position of the servo track and servo sector on the disk relative to other tracks and sectors. Gray code may be used to encode the track identifier in a set of bits of a predetermined field length defined by the format. Because partial reads of individual track Gray code values are common during seek operations, Grey codes may be constructed such that portions of the track identifier can be combined from adjacent tracks to give approximate track location during seeks. Symbol timing for correctly positioning bits in the Gray code may be important for properly decoding the Gray code and ensuring accurate gross positioning information during full servo operations, such as seek, head load, head switch, and servo error recovery, where gross position may be rapidly changing or have an unknown starting value.

Figure 1A:
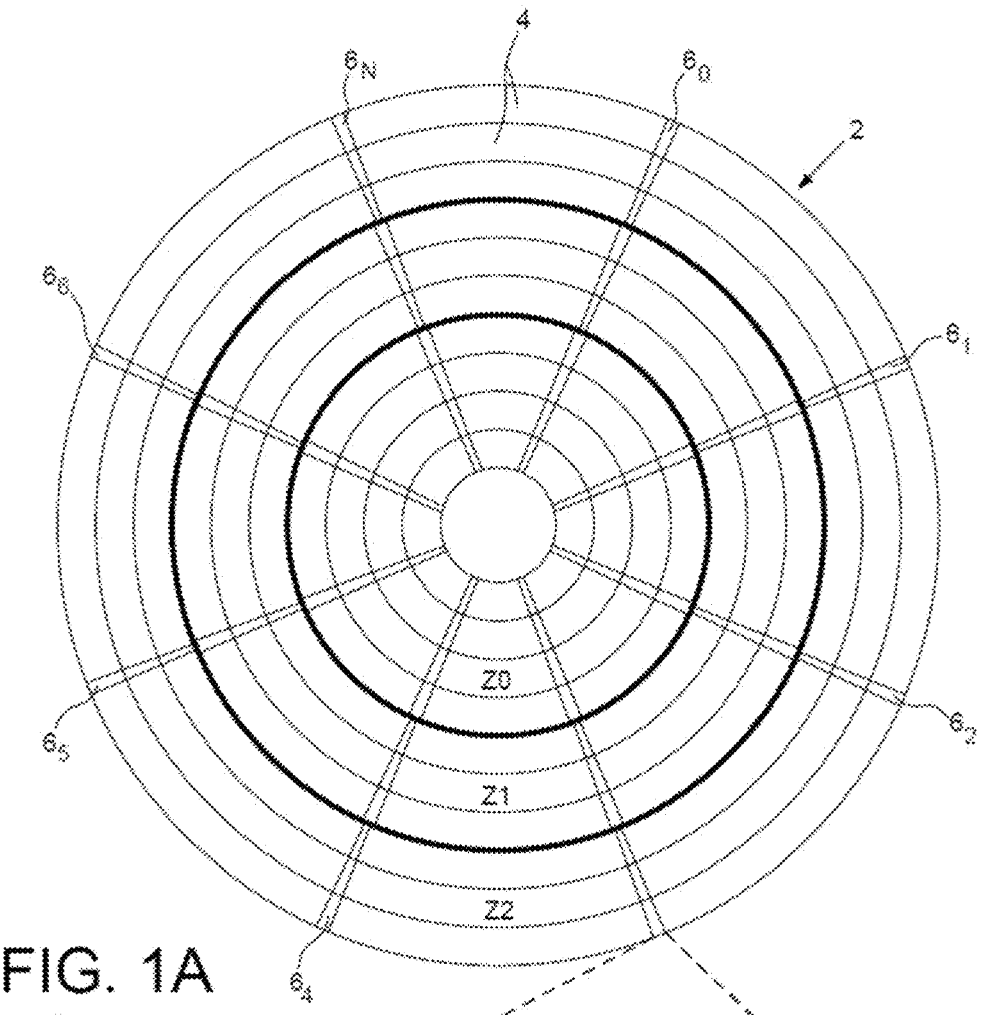
FIG. 1A (Prior Art)
FIG. 1A is a diagram of a prior art disk format.

Servo positioning bursts 110 and 112 may provide fine positioning information relative to track center. For example, a set of position error bursts (A and B bursts in FIG. 2B) may act as a position error field that provides fractional track position based on a nominal track center. The PES for a servo sector read may be determined based on the relative values of the different bursts in the set. Assuring that the symbol timing is correct may be important for accurately determining the position error signal from servo positioning bursts 110 and 112. Note that while two servo positioning bursts 110 and 112 are shown in format 100, any appropriate number of servo bursts (such as the 4 bursts in FIG. 1A or 6 bursts in FIG. 5) may be used, including amplitude or phase-based servo burst patterns. In the example shown, the set of position error bursts comprises a first burst 110 and a second burst 112. Phase offsets 108 may be applied to these bursts during writing. For example, first burst 110 may be offset from a first phase in a first direction by a phase offset value, while the second burst 112 may be offset from the first phase in an opposite direction by the phase offset value. The phase offset value may be a fractional offset of a cycle time of the servo pattern that is less than half of the cycle time, such as a phase adjustment value greater than zero and up to 0.35T or 0.5T with 4T being one cycle in the servo preamble waveform, and 8T being one cycle of the half rate servo bursts A and B. In this case, a maximum of 0.5 T phase shift of an 8T half rate burst is 1⁄16 of a cycle's phase shift for a write frequency of the servo pattern.

Figure 2C:
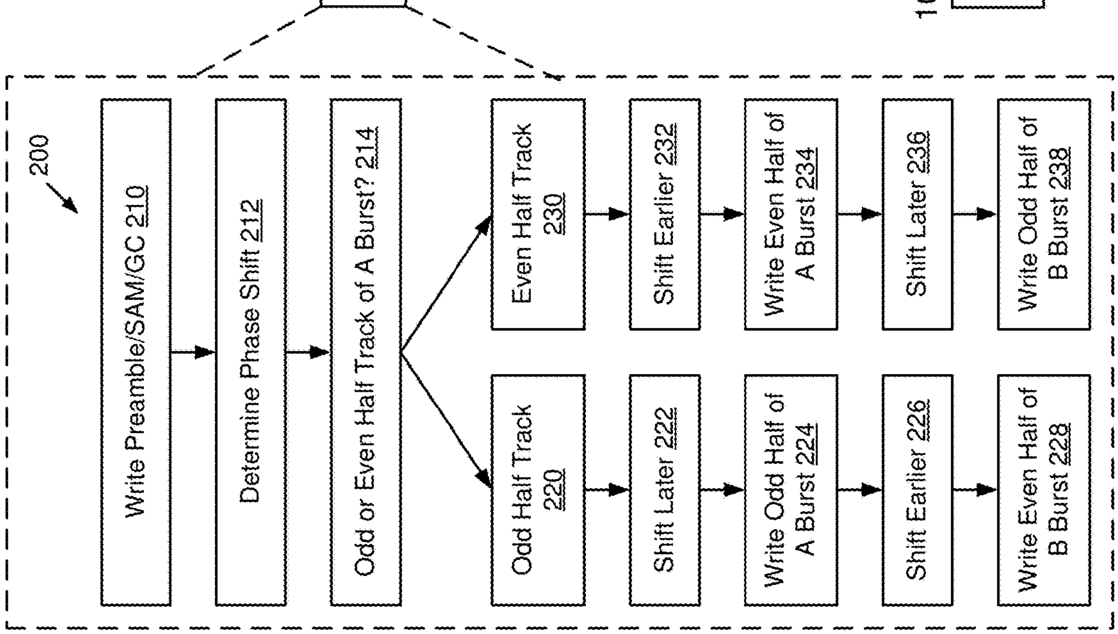
FIG. 2C is a flow diagram of an example method for writing phase shifted servo bursts during servo write operations.

FIG. 2C illustrates a servo write process 200 that may be used by control circuitry 22 to write the servo sectors 32 with phase adjustments. The process may begin at block 210 with writing a preamble, SAM, and Gray code portion of the servo sector at a nominal phase based on the channel clock. At block 212, a phase shift may be determined for the track and sector.

In some embodiments, the servo write process 200 may involve writing the first portion (e.g., preamble, SAM, gray code) and the set of position error bursts in multiple passes for each servo track. For example, servo sectors may be written in halftracks to support the writing of servo bursts, such as stitched servo bursts, at track offsets to provide fractional track positioning information. A decision at block 214 may determine whether the current half track being written is odd or even (first pass or second pass).

For writing odd halftracks of A burst (i.e., the first half of B burst), the process may follow blocks 220, 222, 224, 226, and 228. For even halftracks of A burst, the process may follow blocks 230, 232, 234, 236, and 238. This alternating pattern allows the first direction and the opposite direction of the phase offsets to alternate across each adjacent pass of the multiple passes. In some cases, the burst pattern of the first burst 110 and the second burst 112 may change across each adjacent pass of the multiple passes. The burst pattern may include at least one stitched burst across each adjacent pass of the multiple passes. A relative offset of bursts contributing to the at least one stitched burst may align the at least one stitched burst to increase signal-to-noise ratio during read-back for the at least one stitched burst relative to the set of position error bursts written at the first phase. This alignment may enhance the accuracy of the position error signal generated from the servo bursts.

At block 220, an odd halftrack or first pass for writing the target A burst may be identified. At block 222, the phase may be shifted later or delayed from the nominal phase of the first portion using a phase offset value and then, at block 224, the odd half of the first burst 110 (i.e., A burst) may be written. At block 226, the phase may be shifted earlier or accelerated from the nominal phase of the first portion using the phase offset value and then, at block 228, the even half of the second burst 112 (i.e., B burst) may be written.

At block 230, an even halftrack or second pass for writing the target track may be identified. At block 232, the phase may be shifted earlier or accelerated from the nominal phase of the first portion using the phase offset value and then, at block 234, the even half of the first burst 110 may be written. At block 236, the phase may be shifted later or delayed from the nominal phase of the first portion using the phase offset value and then, at block 238, the odd half of the second burst 112 may be written.

Figure 1B:
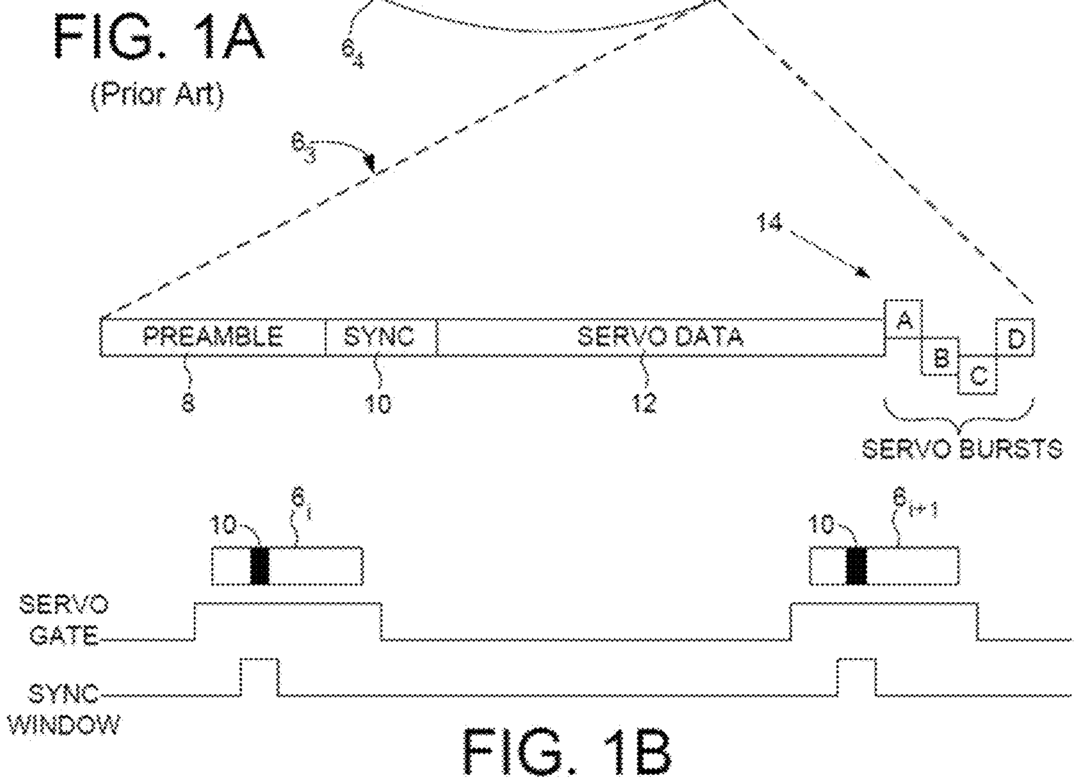
FIG. 1B (Prior Art)
FIG. 1B is a diagram of prior art servo timing signals, including a servo gate and sync window for a servo address mark.
Figure 3:
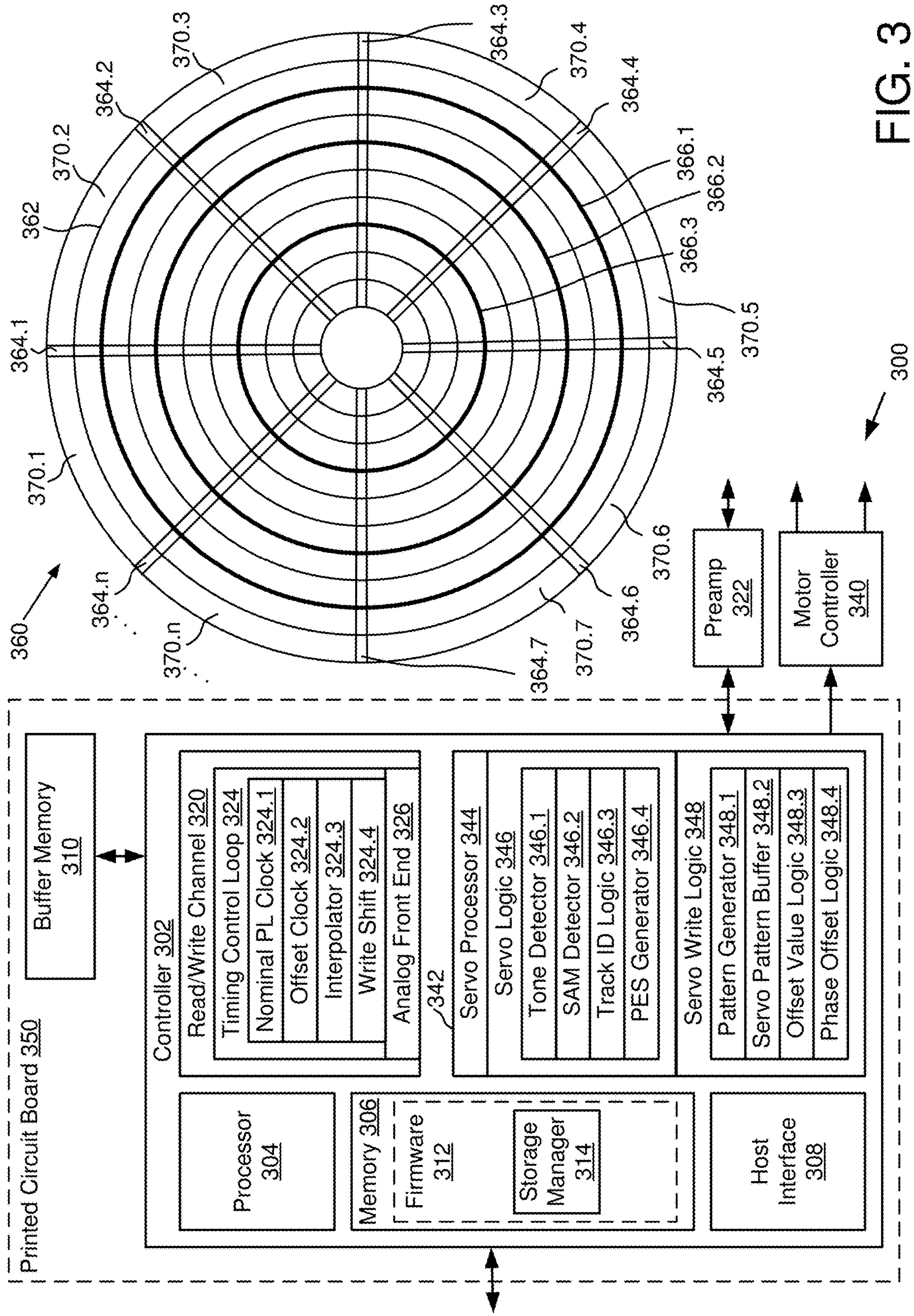
FIG. 3 is a block diagram of a configuration of data storage device including control circuitry and a storage medium format for writing and using servo sectors with track-to-track phase adjustments for the servo bursts.

FIG. 3 shows a portion of example control circuitry 300 and a storage medium 360 for a data storage device, such as a hard disk drive (HDD). In the example shown, control circuitry 300 may include one or more hardware controllers that operate alone or in combination. Controller 302 may comprise a storage device controller configured to receive host storage commands, process storage operations for writing, reading, and managing data stored to non-volatile storage media in the disk drive, such as the magnetic media disk of storage medium 360 or FIGS. 1 and 2. In some configurations, controller 302 may correspond to a separate host interface and read/write path to a subset of disk surfaces in a data storage device with multiple controllers. Controller 302 may be configured to manage servo and read/write operations for one or more actuators, heads, and corresponding writer and reader elements. Controller 302 may also be configured for servo writing operations during the manufacture of the data storage device to write the servo pattern to storage medium 360. Storage medium 360 may be formatted with angularly spaced servo sectors 364.1-364.*n* defining corresponding data sectors 370.1-370.*n* between consecutive servo sectors. As described elsewhere, servo sectors 364 define servo tracks which may be used to locate data tracks through data sectors 370. In some configurations, servo tracks and/or data tracks may be divided into concentric zones, such as example zones 366.1-366.3.

Controller 302 may comprise a processor 304, a memory 306, a host interface 308, and access to a buffer memory 310. Controllers 302 may also comprise a read/write channel 320, and a servo controller 342 including a servo processor 344 and servo logic 346. Servo write logic 348 may be executed by servo controller 342 and/or a combination of servo controller 342, processor 304, memory 306, firmware 312, and read/write channel 320. In some embodiments, one or more of host interface 308, read/write channel 320, and servo controller 342 may be embodied in separate packages, such as application specific integrated circuits (ASICs), systems on a chip (SOCs), or other specialized circuits that interface with processor 304 and memory 306 for carrying out their respective functions. Controller 302 may include physical and electrical interfaces for connecting to buffer memory 310, a power source (not shown), preamp 322, motor controller 348, other controllers, and/or other circuitry components. In some configurations, the components of controller 302 may be interconnected by a bus that includes one or more conductors that permit communication among the components. For example, processor 304, memory 306, host interface 308, read/write channel 320, and/or servo controller 342 may be components attached to a printed circuit board assembly (PCBA) 350 that provides one or more layers of interconnect conductors among the components.

Processor 304 may include any type of conventional processor or microprocessor that interprets and executes instructions. In some configurations, one or more microprocessors or processor cores may be configured to operate alone or in combination to execute the functions described herein. Memory 306 may include a random access memory (RAM) or another type of dynamic storage device that stores information and instructions for execution by processor 304 and/or a read only memory (ROM) or another type of static storage device that stores static information and instructions for use by processor 304 and/or any suitable storage element, such as a system portion of a hard disk media or a solid state storage element. Memory 306 may be configured to store controller firmware 312, comprising instructions that include one or more modules or sub-modules for specific data storage device operations and processor 304 may execute those instructions, including controlling communication with other components, such as host interface 308, buffer memory 310, read/write channel 320, and servo controller 342.

Controller firmware 312 may include a storage manager 314 configured to receive host storage commands through host interface 308 and determine storage operations to be executed by controller 302 using read/write channel 320 and servo controller 342. For example, storage manager 314 may process read, write, delete, and similar commands targeting host data to be written to or read from the storage medium of the data storage device. Processing a read operation may include causing servo controller 342 to position the read head over a desired track on the storage medium, applying a read voltage to the read head through preamp 322, receiving the read data in read/write channel 320, decoding the read data from the read head into decoded bit data returned to storage manager 314 (and/or buffer memory 310). Processing a write operation may include causing servo controller 342 to position the write head over a target track on the storage medium and applying a write voltage with a desired write pattern to the write head through preamp 322 to store binary encoded data in the magnetic domains of the storage medium for later retrieval through a read operation. Servo controller 342 may use a combination of track seek operations and track follow operations based on servo tracks to position the head for reading and writing of host data on data tracks.

Host interface 308 may include any transceiver-like mechanism that enables the data storage device to communicate with other devices and/or systems, such as a host system for which the storage device provides data storage. Host interface 308 may comprise a host storage interface compliant with one or more storage interface standards, such as a Serial Advanced Technology Attachment (SATA) interface, a Small Computer System Interface (SCSI), serial attached SCSI (SAS), peripheral computer interface express (PCIe) (e.g., Non-Volatile Memory Express (NVMe)), etc., for connecting host interface 308 to peripheral interface or network port.

Buffer memory 310 may include a RAM, flash, or another type of dynamic storage device for storing host data and other information in transit between the storage media of the storage device and the host (via host interface 308). In some embodiments, buffer memory 310 is a separate memory device from memory 306 and the disk surfaces or other non-volatile memory of the data storage device.

Read/write channel 320 may include one or more specialized circuits configured for processing binary data to be written to the disk surfaces using an analog write signal and processing the analog read signal from the disk surfaces back into binary data. For example, read/write channel 320 may include a write path comprised of various data scramblers, run-length limited (RLL) encoders, iterative error correction code (ECC) encoders, precompensation circuits, and other data or signal processing components. Read/write channel 320 may include a read path comprised of various amplifiers, filters, equalizers, analog-to-digital converters (ADCs), soft information detectors, iterative ECC decoders, and other data or signal processing components. The write channel components may comprise a write channel circuit and the read channel components may comprise a read channel circuit, though the circuits may share some components. Read/write channel 320 may provide the analog write signal to and receive the analog read signal from preamp 322, which controls and amplifies signals to and from the heads. Binary data for recording to the storage medium may be received by read/write channel 320 from controller firmware 312 and decoded data from read/write channel 320 may be passed to controller firmware 312 and/or directed to buffer memory 310 for communication to the host.

In some configurations, read/write channel 320 may include an analog front end 326 configured to receive the analog read signal from preamp 322 and convert it into a digital read signal for processing by other components of read/write channel 320. For example, analog front end 326 may include an analog-digital converter (ADC), timing circuit, and one or more filters, equalizers, and/or other signal conditioning components for generating the digital read data. In some configurations, analog front end 326 and/or other components of read/write channel 320 may support operations of servo controller 342. For example, the read signal received through preamp 322 and analog front end 326 may provide the servo read signal based on the read head response generated when the head passes over servo sectors 364 during track seek, track follow, and other servo operations.

In some configurations, channel 320 may include a timing control loop 324 configured to synchronize the read channel with the data rate to determine digital data samples from the analog read signal for further processing by read/write channel 320 and/or servo controller 342. For example, timing control loop 324 may use a phase locked loop (PLL) to synchronize to the frequency and phase of the analog read signal to control the ADC sampling of analog front end 326. In some configurations, the PLL may receive expected samples for a target response from the ADC and use phase error and suitable compensation filters to generate a control signal to adjust the center frequency for synchronizing a disk locked clock. The adjusted frequency from the disk locked clock may be fed back to the ADC and continue to adjust until synchronization is achieved. In some configurations, servo gate and sync windows for servo controller 342 may be determined from timing control loop 324 based on the preamble of the servo sector being read and/or based on SAM-to-SAM timing (using SAM and/or SAMx). Once timing control is established for track follow, servo and/or read data may be used to maintain timing (and gain control) until the next servo wedge, where the timing information derived from the preamble (if available) and/or SAM timing may be used to maintain signal timing. For example, SAM-to-SAM timing across consecutive servo wedges based on SAMx may be used for updating the disk locked clock.

In some configurations, timing control loop 324 may operate using a nominal phase locked clock 324.1 that provides reliable frequency and phase for sampling data from the analog read signal. This same nominal clock signal may also be used for writing data, whether user data in data sectors 370 or servo data written during servo writing operations. In order to write servo bursts with a phase that is different than the nominal phase of the clock signal, read/write channel 320 may support one or more mechanisms for making fractional changes to the phase to improve the alignment of stitched servo bursts. In some configurations, these phase offset values may be less than half the cycle time of the nominal clock signal. Read/write channel hardware may be configured to support a maximum fractional offset of 0.35T or 0.5 T and increments of offset values less than 0.1 T with one cycle of waveform constituting of 8 clock cycles or 8T. For example, the phase offsets supported may include a range from 0 to 0.25T in increments of $\frac{1}{128}$T (0.0078T) to support granular calibration of phase offsets based on physical parameters of the heads, disk magnetics, and radial track locations from the inner diameter (ID) to the outer diameter (OD). Additionally, read/write channel 320 may support the phase offset value being applied in opposite directions as phase delays and accelerations and opposed offset values may be applied to each pair of bursts to result in a net phase change of 0 following the bursts.

An example circuit or function for enabling fractional phase adjustments for each servo burst may include multiple clock systems that support parallel phase offset clock signals. For example, nominal phase locked clock 324.1 may include or interface with a plurality of offset clock circuits 324.2, where each offset clock circuit corresponds to a secondary clock system that generates an offset clock signal. The number of offset clock circuits 324.2 may depend on the range and number of increments to be supported, in addition to the opposed positive and negative phase shift directions. For example, one set of offset clock circuits 324.2 may generate phase delayed clock signals and another set may generate phase accelerated clock signals. Offset clock circuits 324.2 may be electively engaged for writing different fields of the servo sector. For example, offset clock circuits 324.2 may be indexed or selected by the phase offset value to be applied to the burst and selectively switched to be used only while the write circuit is writing the burst pattern. As an alternative to maintaining and selectively engaging a number of parallel clock systems, a set of parallel timing interpolator circuits 324.3 may be used to modify the nominal clock signal for the desired phase shift. For example, a set of timing interpolators where each timing interpolator is configured for an incremental phase shift, such as 1/64T, 1/32T, 3/64T, 1/16T, 5/64T, 3/32T, 7/64T, 1/8T, 9/64T, 5/32T, 11/64T, 3/16T, 13/64T, 7/32T, 15/64T, and 1/4T. Each interpolator may be operated directionally for positive and negative phase shifts and/or part of an interpolator pair for corresponding positive and negative phase shifts.

Another example circuit or function for enabling fractional phase adjustment for each servo burst may include a phase write shift circuit 324.4 that may selectively shift the phase of the pattern data on a per field basis as it is sent to the write circuit. The write circuit may include an analog phase bias circuit operated by a corresponding parameter on a per field basis. For example, the digital-to-analog converter (DAC) circuit may include various circuits and control parameters for boosting amplitude, phase, and/or frequency of the resulting write signal with the desired field accuracy, phase increments, and opposed directions for the first and second bursts.

Servo controller 342 may include one or more specialized circuits configured to process servo data, such as position error signals, from the disk surfaces and providing a control signal to position the actuators in a closed-loop control system. Servo controller 342 may also receive commands from processor 304 for positioning operations, such as seek, track follow, load, unload, sweep, idle, and other actuator positioning operations. Servo controller 342 may also implement servo error recovery processes for recovering from servo errors. In some embodiments, servo controller 342 may include servo processor 344 and servo logic 346 (stored in a servo memory). For example, servo processor 344 may include one or more dedicated processor circuits and servo logic 346 may be firmware stored in RAM associated with the dedicated processor to provide dedicated computing resources for managing the servo functions. Servo controller 342 may receive servo signals read from the disk surface using preamp 322 and provided to servo controller 342 through channel 320. Servo controller 342 may provide servo control signals to motor controller 340, and motor controller 340 may control one or more actuator VCMs and/or a spindle motor for rotating the disk stack.

Servo logic 346 may include servo gate timing to trigger the processing of the various fields in the servo sector of a target track and sector. A tone detector 346.1 may be configured to detect the tone pattern of the preamble in response to the servo gate. For example, tone detector 346.1 may include a detector circuit that recognizes the tone pattern and uses a plurality of cycles of the tone pattern to set servo gain values and find timing lock for timing control loop 324. Servo logic 346 may include one or more SAM detectors, such as SAM detector 346.2. SAM detectors may detect a synchronization mark in the read signal to establish symbol timing for accurately reading subsequent bits or symbols and aligning each servo field with the corresponding processing logic. SAM detectors may operate on a synchronization window relative to the servo gate to execute SAM detection and synchronization to symbol timing. In some configurations, servo fields may be encoded in bit patterns and symbol timing may align with single bit transitions in the read signal. Servo logic 346 may include track identifier logic 346.3 for determining one or more track identifier values from a track identifier field. For example, track identifier logic 346.3 may include a Gray code decoder configured to determine one or more track identifier values from the read signal based on symbol timing and the symbol sequence detected in the track identifier field. In some configurations, track identifier logic 346.3 may be configured to determine portions of the Gray code for a given track during seek or recovery operations and use portions from proximate track identifiers to provide coarse location information for controlling the seek or recovery operation.

Servo logic 346 may include PES generator 346.4 configured to process the read signal corresponding to the set of servo bursts for fine positioning feedback to the servo control loop. For example, PES generator 346.4 may process the phase or amplitude values from the servo positioning bursts to determining fractional offsets from track center to determine the PES that is input into the servo control loop to determine a corrective motor control signal sent to motor controller 340 to adjust the positioning of the head for subsequent reads or writes. Symbol timing may be applied to the servo position burst samples to assure that the burst read values correspond to the correct bit transitions and corresponding bursts. Note that phase-based burst patterns may include opposed phase values corresponding to 180 degree differences in phase. These encoded phase differences between burst patterns are distinguishable from the fractional phase shifts used to better align the half bursts of stitched bursts within those phase-based patterns.

Servo write logic 348 may include functions and circuits for writing the servo sector format for each servo sector and track to disk 360. For example, during servo write operations, servo write logic 348 may use servo controller 342 to use previously written spiral reference patterns for location feedback to control the actuator through motor controller 340 and send write signals through read/write channel 320 and preamplifier 322 to the write element of the head to write servo sectors to the storage medium at the desired locations. In some configurations, the servo sector format may be written in two passes for each track to support cross track offsets of stitched bursts in the burst patterns. Servo write logic 348 may include a pattern generator 348.1 configured to generate the servo field values for the particular track and sector to populate the servo sector format. Pattern generator 348.1 may generate each set of servo sector data and write it to servo pattern buffer 348.2. The servo data from servo pattern buffer 348.2 may be used by the write circuit of read/write channel 320, preamplifier 322, and the write element in the head to provide an analog write signal for writing the servo sectors to the disk.

In some configurations, servo write logic 348 may be configured for applying phase offsets to the bursts of the set of position error bursts in each servo sector. For example, servo write logic 348 may include offset value logic 348.3 configured to determine a phase offset value to be applied to each burst. In some configurations, offset value logic 348.2 may be configured with a map of phase offset values based on the radial position of the track being written. For example, the set of phase offset values for a particular data storage device may be based on head geometry, media magnetics, and radial position determined offline for a population of drives or generated by a offset value calibration operation executed drive manufacturing prior to or as a step in self-servo write operations. Phase offset logic 348.4 may be configured to use the phase offset values from offset value logic 348.3 to adjust the phase of each burst in the burst pattern on a track-by-track basis. For example, phase offset logic 348.4 may include or initiate field-base phase offset features. such as offset clock circuits 324.2, interpolator circuits 324.3, and/or phase write shift circuits 324.4 to selectively shift the phase of bursts by the phase offset value. In some configurations, phase offset logic 348.4 may be configured to identify burst pairs based on the half-track being written and apply the phase offset value in opposite directions to the two bursts in the burst pair.

Figure 4:
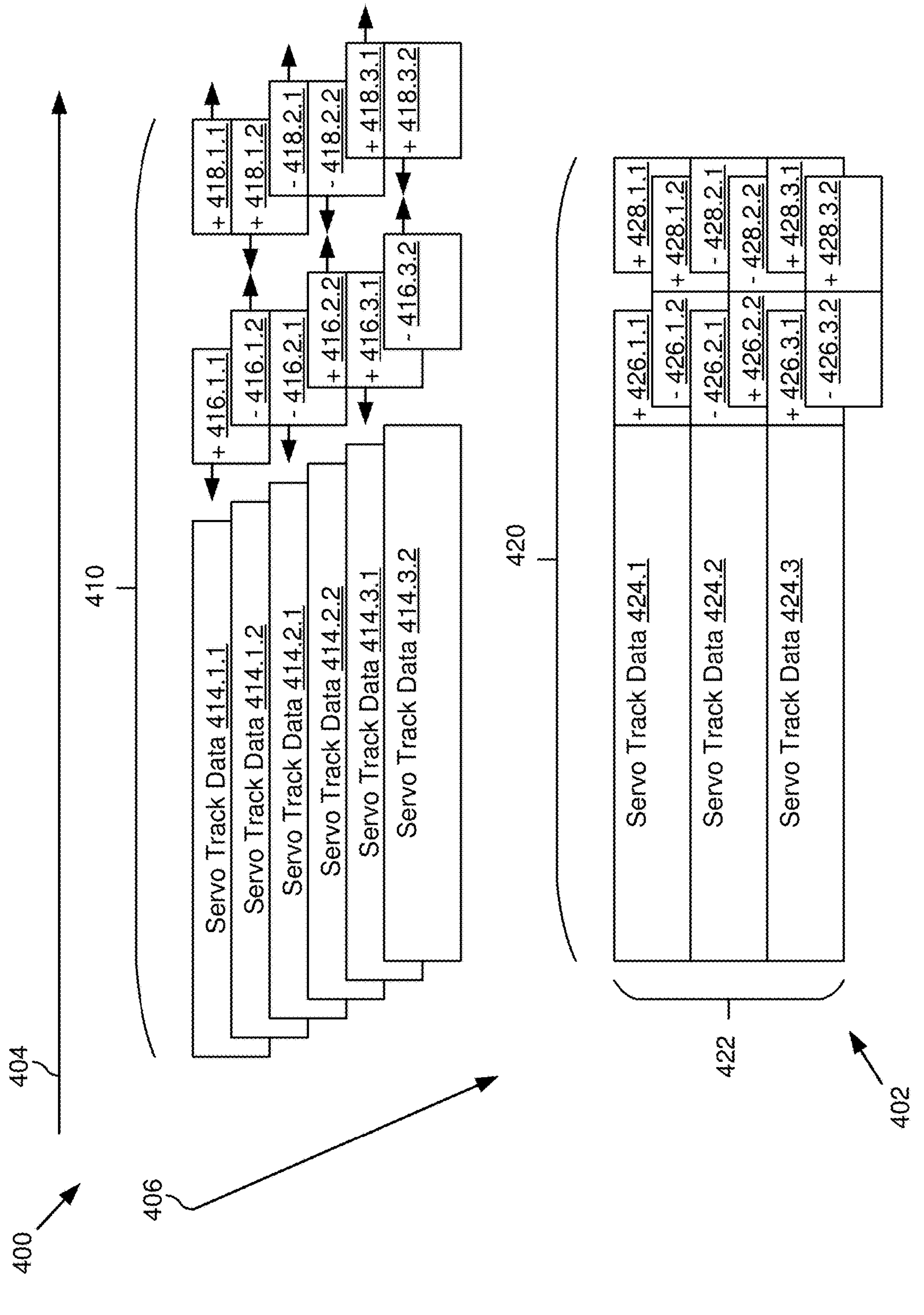
FIG. 4 is a block diagram of an example servo sector write pattern with track-to-track phase adjustments for the servo bursts.

FIG. 4 shows a servo sector write diagram 400 showing the organization of servo data during servo write operations in both downtrack direction 404 and track-to-track servo write direction 406. The servo sector write diagram 400 shows the pattern of phase shifts used to write various burst pairs to better align the stitched bursts. The upper portion 410 shows the series of halftrack writes for three servo tracks and corresponding burst patterns. The lower portion 420 shows the resulting tracks and bust patterns on the disk as seen by the write element during readback.

Servo sector data 410 may comprise multiple servo track data portions where each halftrack write includes servo track data, such as a preamble, SAM, and Gray code, and a pair of bursts. The servo track data may be written as two passes of the same data pattern. For example, first servo track data portions (414.1.1, 414.1.2), second servo track data portions (414.2.1, 414.2.2), and third servo track data portions (414.3.1, 414.3.2) may include two passes of the same data pattern meant to be read together to identify the servo track and sector location. Adjacent to these track data portions may be corresponding burst patterns. The burst patterns may be offset from track center to enable the servo system to determine distance from track center and reposition the head to follow the track. The first bursts may include bursts 416.1.1, 416.1.2, 416.2.1, 416.2.2, 416.3.1, and 416.3.2. The second bursts may include bursts 418.1.1, 418.1.2, 418.2.1, 418.2.2, 418.3.1, and 418.3.2. While the bursts are shown as single polarity (+/−) bursts representing a magnetic transition (and corresponding change in amplitude or phase), each burst may correspond to a burst pattern comprised of multiple magnetic transitions from which the readback signals are in-phase or out of phase relative to the preambles and SAM/Gray code. Additionally, while a single pair of bursts are shown, additional burst (such as an additional A burst after the B burst) and/or burst pairs may be included in the set of bursts as described elsewhere.

The arrows around bursts 416 and 418 show the direction of their respective phase shifts. In each pair of bursts, the bursts are phase shifted in opposite directions. For example, burst 416.1.1 is phase shifted in a first direction (accelerated) and burst 418.1.1 is phase shifted in the opposite direction (delayed). The pattern of phase shifting alternates between half track passes. For example, bursts 416.1.1 and 418.1.1 are shifted outwards in the first halftrack pass for servo track data 414.1 and bursts 416.1.2 and 418.1.2 are shifted inwards in the second halftrack pass.

In lower portion 420, resulting servo tracks 422 are shown. Servo sector data 420 may have three servo track data portions (424.1, 424.2, 424.3) resulting from the combination of the two halftrack passes. These may be accompanied by corresponding first burst patterns (426.1.1, 426.1.2, 426.2.1, 426.2.2, 426.3.1, 426.3.2) and second burst patterns (428.1.1, 428.1.2, 428.2.1, 428.2.2, 428.3.1, 428.3.2). These stitched bursts result in offset bursts at half track increments. For example, bursts 426.1.2 and 426.2.1 form a stitched burst aligning two halftrack burst writes for a burst offset across the first and second servo tracks and bursts 426.1.1 and 428.1.2 form a second stitched burst aligned with the first servo track. The result of the phase shifts are relatively small adjustments to the magnetic transitions written to the disk where the transitions encoding the bursts are accelerated or delayed relative to the rest of the servo sector by less than 0.5T and the sum of those adjustments across burst pairs is a 0 phase shift to maintain the overall phase alignment of the servo sectors.

Figure 5:
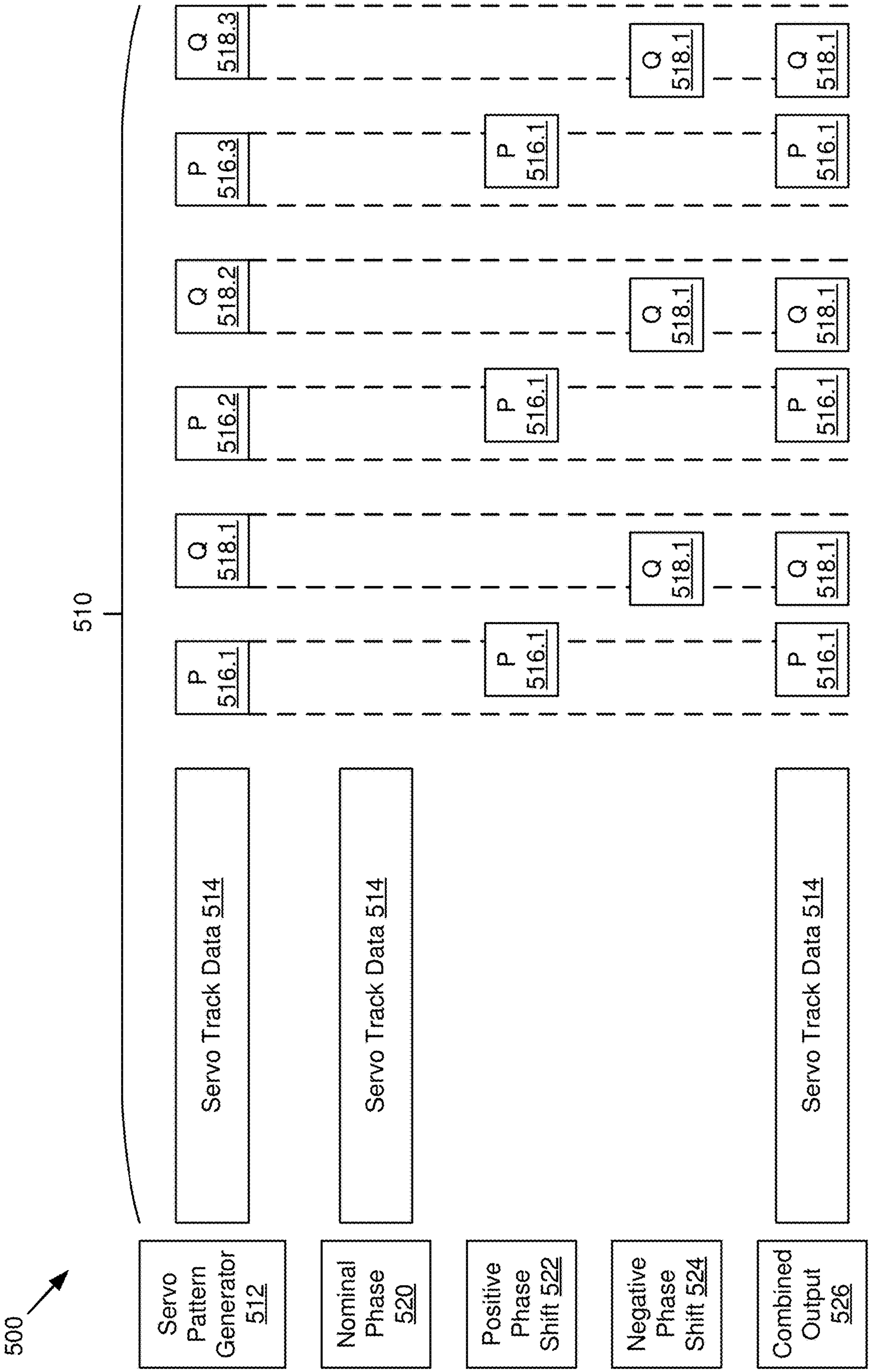
FIG. 5 is a block diagram of example servo write data generation with phase adjustments to multiple bursts in a set of position error bursts.

As shown in FIG. 5, a servo write system 500 may be used for writing servo sector data 510 with phase adjustments. A servo pattern generator 512 may generate servo track data 514 and a corresponding set of bursts for a burst pattern to be written with servo track data 514. The burst pattern may be arranged in alternating P and Q burst patterns, including a first P burst 516.1, a first Q burst 518.1, a second P burst 516.2, a second Q burst 518.2, a third P burst 516.3, and a third Q burst 518.3. Servo sector data 510 may correspond to a halftrack to be written to the storage medium during a servo write operation.

In some configurations, after the servo pattern for the particular halftrack write is determined, the system may selectively shift the phase of some of the fields by a fractional phase shift. In the configurations shown, the system includes a nominal phase 520, such as the phase of the disk locked clock or phase lock loop that governs read/write channel timing. Servo track data 514 may be written at nominal phase 520 without any field-based phase intervention. The system may also be configured with circuitry to selectively introduce a positive phase shift 522 and a negative phase shift 524 to bursts in the servo burst pattern. For example, each P burst 516 may receive a phase acceleration from positive phase shift 522 and each Q burst 518 may receive a phase delay from negative phase shift. A combined output 526 may be sent to the write circuit with the desired phase shifts for the head to write the fields to the storage medium.

In some configurations, positive phase shift 522 and negative phase shift 524 may receive the same phase offset value for writing the servo track. For example, the system may determine the phase offset value from a prior calibration for the radial position of the target servo track and provide the phase offset value to the positive and negative phase shift circuitry. Additionally, the direction of the phase shifts may be alternated by the halftrack. For example, during a second pass for writing servo track data 514, the phase shifts for the P and Q bursts may be applied in the opposite direction, where the P bursts 516 are delayed and Q bursts are accelerated.

In some configurations, the write circuitry may include a phase shift circuit configured to adjust the phase of selected fields during the analog writing process. For example, the DAC may include phase shift circuits that receive parameters indicating the fields or field positions to be shifted and the magnitude (phase offset value) and direction (acceleration or delay) of those shifts. In such a configuration, servo pattern generator 512 may generate servo data pattern 510 to the write pattern buffer without the phase shifts and the phase shift parameters provided to the write circuitry may cause the desired phase shifts during the servo write process for field dependent phase control. In other configurations, the data timing may be manipulated based on clock signals, such as using multiple clock systems at different phases or using interpolator circuits to selectively shift the clock signal for the fields being shifted.

Figure 6:
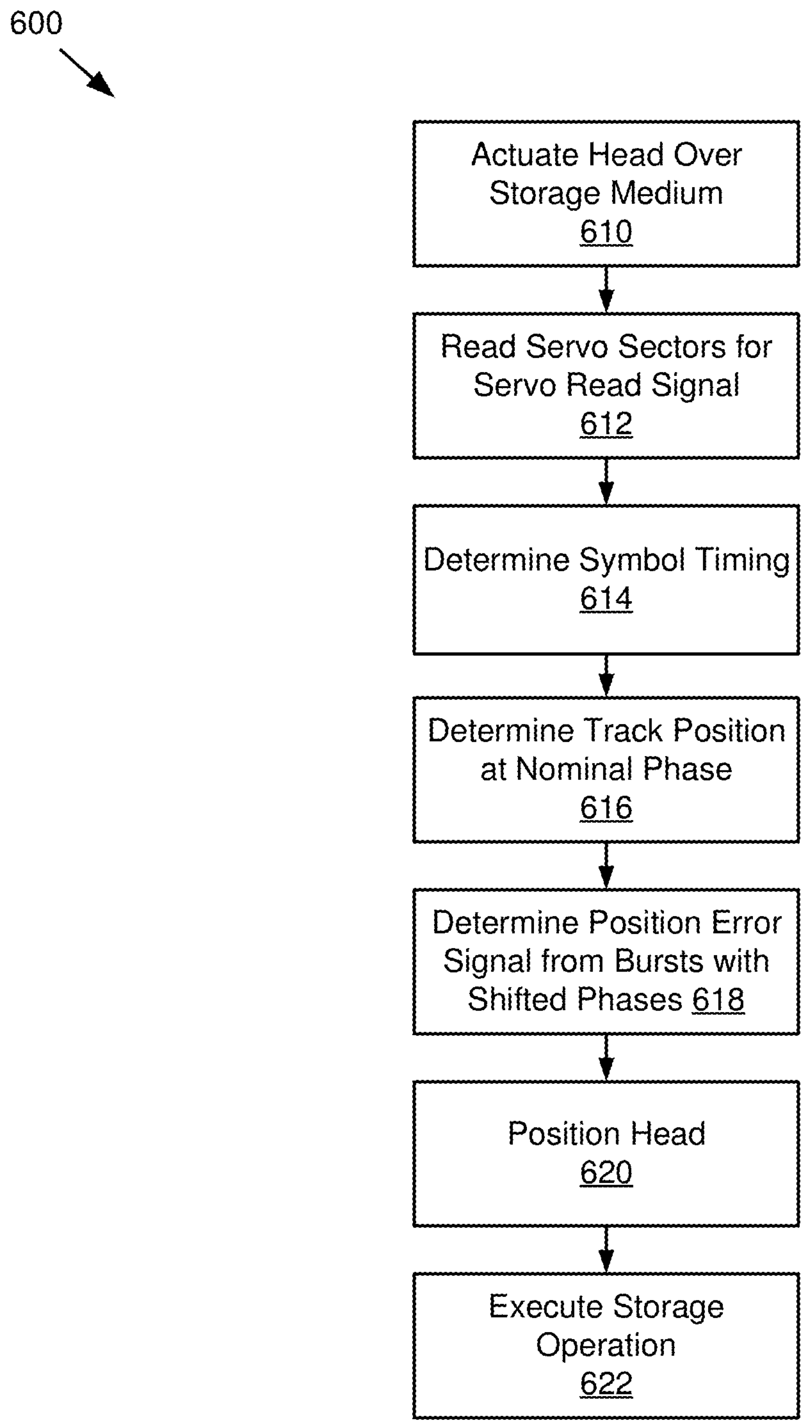
FIG. 6 is an example method of using servo sectors with phase shifted position error bursts to position a head.

FIG. 6 illustrates a flowchart of a method 600 for performing storage operations. Method 600 may be executed by control circuitry of a data storage device, such as control circuitry 22 or 300. Method 600 generally involves actuating a head over a storage medium, reading servo sectors, determining timing and position parameters, and executing a storage operation. By performing these steps, method 600 may enable precise head positioning based on an improved PES generated from the phase shifted bursts for accurate data storage and retrieval operations.

At block 610, a head may be actuated over a storage medium. For example, the control circuitry may send a control signal to a voice coil motor to move the head to or follow a desired track on the disk surface.

At block 612, servo sectors may be read to obtain a servo read signal. For example, the head may pass over servo sectors on the disk surface and generate an analog read signal that is amplified and processed by the read/write channel.

At block 614, symbol timing may be determined. For example, the read/write channel may use a phase-locked loop to synchronize with the servo sector preamble and establish accurate timing for subsequent servo fields.

At block 616, a track position at nominal phase may be determined. For example, the servo controller may decode the Gray code in the servo sector to identify the current track number and sector.

At block 618, a position error signal may be determined from servo bursts with shifted phases. For example, the servo controller may process the phase-shifted servo bursts to calculate a more precise position error signal for fine head positioning relative to a nominal track center.

At block 620, the head may be positioned based on the determined position error signal. For example, the servo controller may generate a control signal to adjust the voice coil motor current (and adjust any microactuators) and move the head to the desired position over the track.

At block 622, a storage operation may be executed using the positioned head. For example, once the head is accurately positioned, the control circuitry may initiate a read or write operation to transfer data between the storage medium and a host device.

Figure 7:
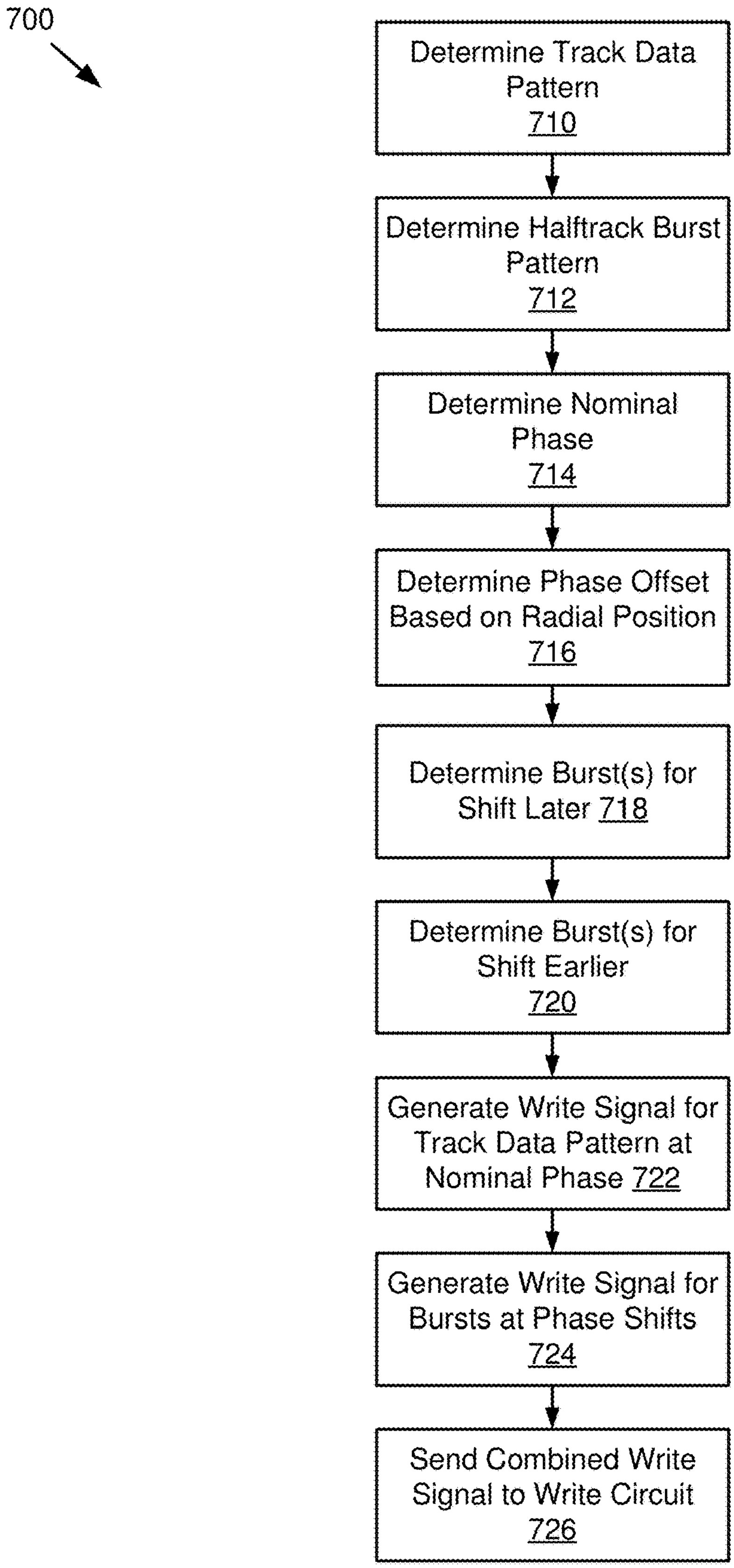
FIG. 7 is an example method of writing servo sectors with track-to-track phase adjustments for the servo bursts.

FIG. 7 illustrates a flowchart of a method 700 for generating write signals with phase adjustments during servo writing operations. Method 700 may be executed by control circuitry of a data storage device, such as control circuitry 22 or 300. Method 700 generally involves determining various patterns and phases, generating write signals, and combining them for servo writing. By performing these steps, method 700 may enable the writing of servo sectors with precise phase adjustments to individual bursts in the set of bursts to improve servo performance.

At block 710, a track data pattern may be determined. For example, the servo write logic may generate a servo pattern for the preamble, SAM, and Gray code fields of the servo sector.

At block 712, a halftrack burst pattern may be determined. For example, the servo write logic may generate a burst pattern for the position error signal bursts, taking into account the halftrack offset for stitched bursts.

At block 714, a nominal phase may be determined. For example, the timing control loop may establish a nominal phase based on the disk locked clock and/or phase lock loop that governs read/write channel timing.

At block 716, a phase offset based on radial position may be determined. For example, the offset value logic may select a phase offset value from a calibrated set of values based on the current radial position of the head.

At block 718, burst(s) for shift later may be determined. For example, the phase offset logic may identify which bursts in the pattern should be delayed based on the current halftrack being written.

At block 720, burst(s) for shift earlier may be determined. For example, the phase offset logic may identify which bursts in the pattern should be accelerated based on the current halftrack being written.

At block 722, a write signal for the track data pattern at nominal phase may be generated. For example, the servo write logic may generate write signal data for the preamble, SAM, and Gray code fields using the nominal phase.

At block 724, a write signal for bursts at phase shifts may be generated. For example, the servo write logic may generate write signal data for the position error bursts using the delayed or accelerated phase shifts as determined by the phase offset logic.

At block 726, the combined write signal may be sent to the write circuit. For example, the servo write logic may combine the write signal data for all servo fields and send the combined write signal data to the write circuit in the head for writing to the storage medium with the determined phase variations.

Figure 8A:
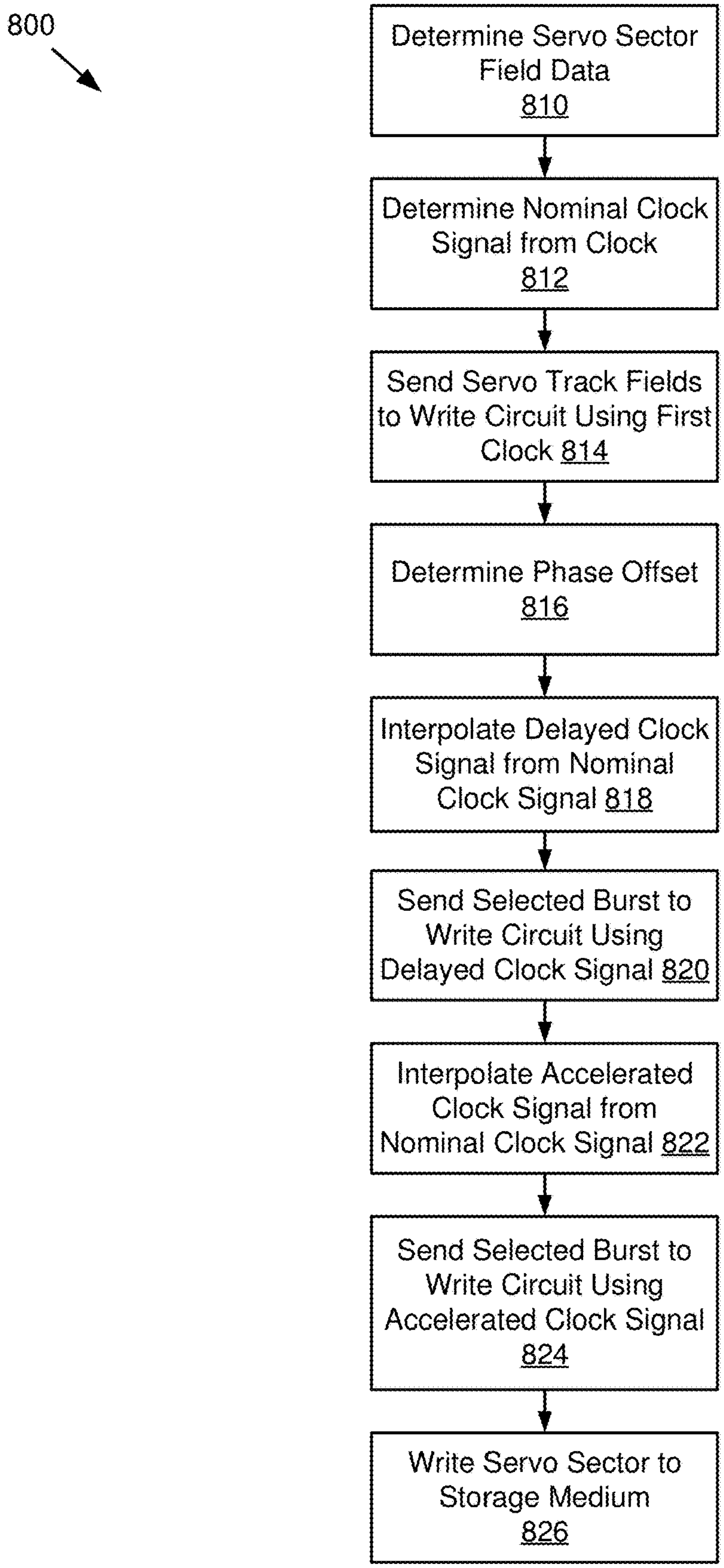
FIG. 8A is a first example method of generating the phase shifted write signal to the write circuit in the head.

FIG. 8A illustrates a flowchart of a method 800 for writing servo sectors to a storage medium using interpolated clock signals for selective adjustment of phase. Method 800 may be executed by control circuitry of a data storage device, such as control circuitry 22 or 300. Method 800 generally involves determining servo sector data, generating clock signals with phase adjustments using interpolation of a nominal clock signal, and writing servo sectors using these adjusted signals. By performing these steps, method 800 may enable the writing of servo sectors with precise phase adjustments on a per field basis to improve servo performance and positioning accuracy.

At block 810, servo sector field data may be determined. For example, the servo write logic may generate the servo pattern data for all fields in the servo sector, including the preamble, SAM, Gray code, and burst patterns.

At block 812, a nominal clock signal from a clock may be determined. For example, the timing control loop may establish a nominal clock signal based on the disk locked clock or phase lock loop that governs read/write channel timing.

At block 814, servo track fields may be sent to a write circuit using the first clock. For example, the servo write logic may send the preamble, SAM, and Gray code data to the write circuit using the nominal clock signal for writing.

At block 816, a phase offset may be determined. For example, the offset value logic may select a phase offset value from a calibrated set of values based on the current radial position of the head and the desired burst alignment.

At block 818, a delayed clock signal may be interpolated from the nominal clock signal. For example, the interpolator circuit may generate a delayed clock signal by shifting the nominal clock signal by the determined phase offset in a later direction.

At block 820, a selected burst may be sent to the write circuit using the delayed clock signal. For example, the servo write logic may send the data for a specific burst field to the write circuit using the delayed clock signal for writing.

At block 822, an accelerated clock signal may be interpolated from the nominal clock signal. For example, the interpolator circuit may generate an accelerated clock signal by shifting the nominal clock signal by the determined phase offset in an earlier direction.

At block 824, a selected burst may be sent to the write circuit using the accelerated clock signal. For example, the servo write logic may send the data for another specific burst field of a burst pair to the write circuit using the accelerated clock signal for writing.

At block 826, the servo sector may be written to the storage medium. For example, the write circuit may use the combined write signals with their respective clock timings to write the complete servo sector, including phase-adjusted bursts, to the disk surface.

Figure 8B:
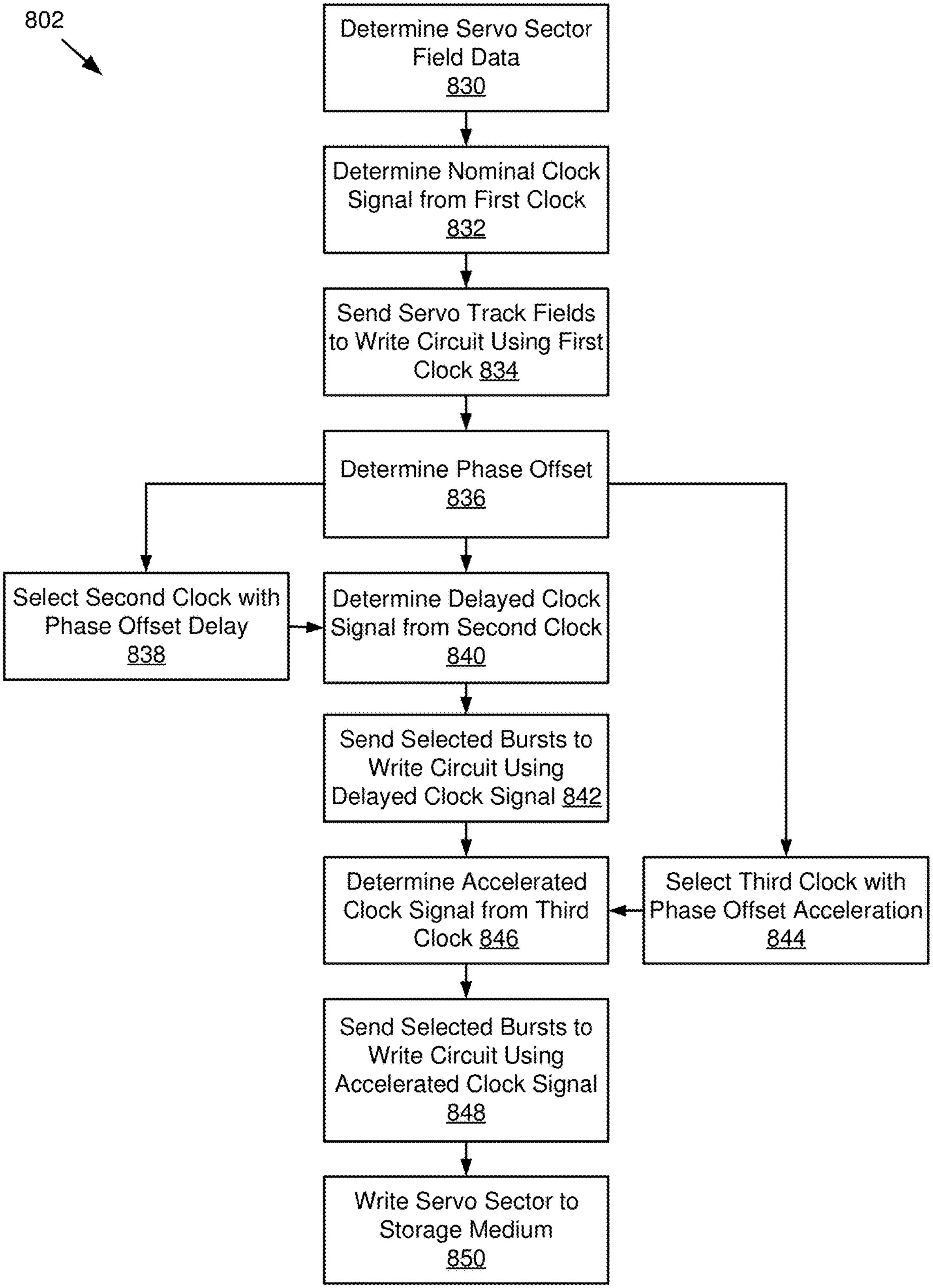
FIG. 8B is a second example method of generating the phase shifted write signal to the write circuit in the head.

FIG. 8B illustrates a flowchart of a method 802 for writing servo sectors using multiple clock signals with phase offsets. Method 802 may be executed by control circuitry of a data storage device, such as control circuitry 22 or 300. Method 802 generally involves determining servo sector data, generating multiple clock signals from multiple clock systems with different phase offsets, and using these signals to write servo sectors with precise phase adjustments to individual fields. By performing these steps, method 802 may enable the writing of servo burst patterns with improved alignment and signal-to-noise ratio for enhanced servo performance. Relative to method 800, method 802 is an alternate configuration for using clock signals to selectively adjust the phase of the bursts in the burst pattern.

At block 830, servo sector field data may be determined. For example, the servo write logic may generate the servo pattern data for all fields in the servo sector, including the preamble, SAM, Gray code, and burst patterns.

At block 832, a nominal clock signal from a first clock may be determined. For example, the timing control loop may establish a nominal clock signal based on the disk locked clock or phase lock loop that governs read/write channel timing.

At block 834, servo track fields may be sent to a write circuit using the first clock. For example, the servo write logic may send the preamble, SAM, and Gray code data to the write circuit using the nominal clock signal for writing.

At block 836, a phase offset may be determined. For example, the offset value logic may select a phase offset value from a calibrated set of values based on the current radial position of the head and the desired burst alignment.

At block 838, a second clock with phase offset delay may be selected. For example, the timing control loop may include another clock configured to generate a clock signal with a specified phase delay relative to the nominal clock.

At block 840, a delayed clock signal from the second clock may be determined. For example, the timing control loop may generate a delayed clock signal using the second clock's output.

At block 842, selected bursts may be sent to the write circuit using the delayed clock signal. For example, the servo write logic may send the data for specific burst fields to the write circuit using the delayed clock signal for writing.

At block 844, a third clock with phase offset acceleration may be selected. For example, the timing control loop may activate another secondary clock system configured to generate a clock signal with a specified phase acceleration relative to the nominal clock.

At block 846, an accelerated clock signal from the third clock may be determined. For example, the timing control loop may generate an accelerated clock signal from the third clock's output.

At block 848, selected bursts may be sent to the write circuit using the accelerated clock signal. For example, the servo write logic may send the data for other specific burst fields to the write circuit using the accelerated clock signal for writing.

At block 850, the servo sector may be written to the storage medium. For example, the write circuit may use the combined write signals with their respective clock timings to write the complete servo sector, including phase-adjusted bursts, to the disk surface.

Figure 9A:
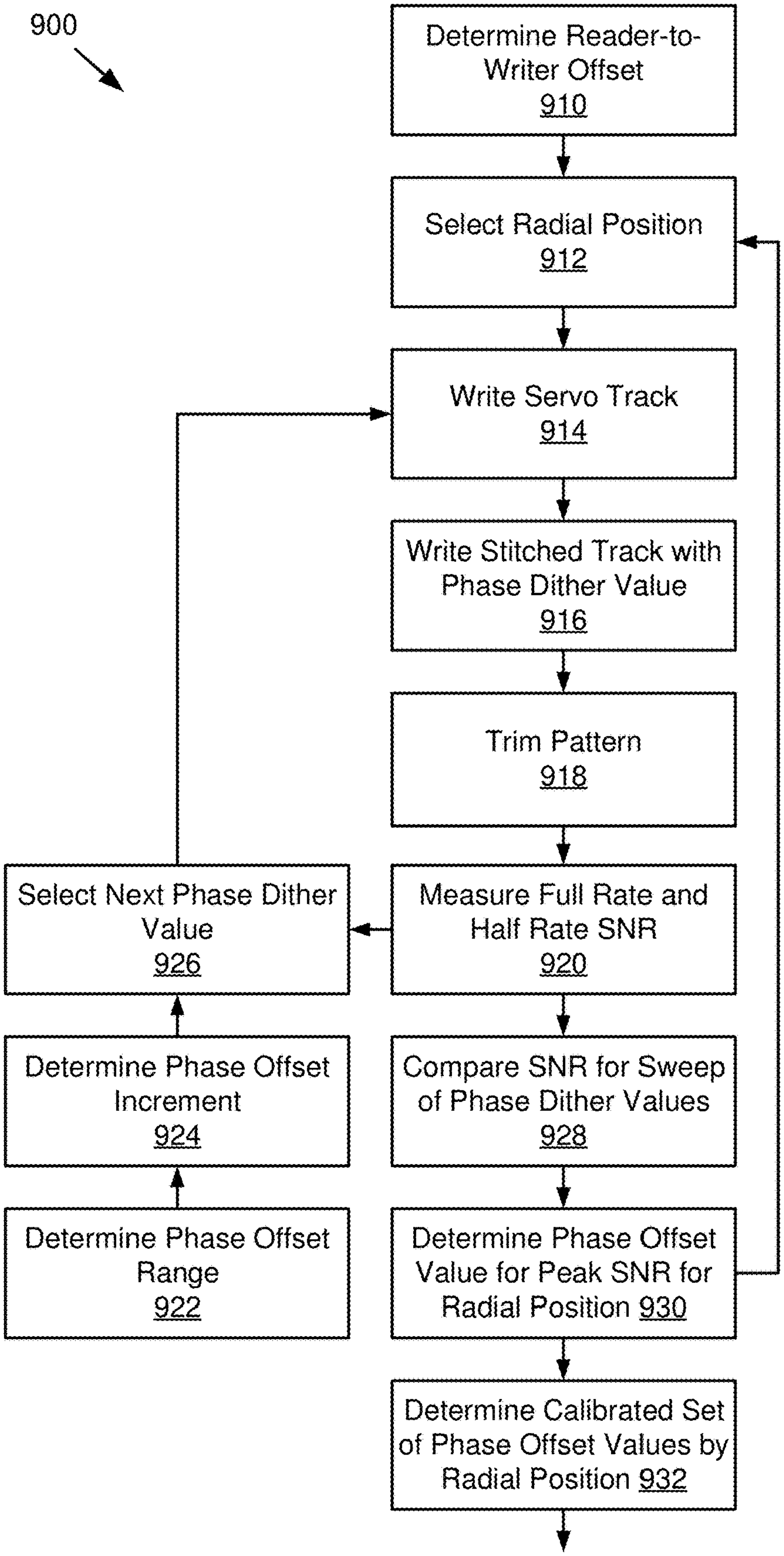
FIG. 9A is an example method of calibrating phase offset values based on radial position across the surface of a storage medium.

FIG. 9A illustrates a flowchart of a method 900 for determining phase offset values. Method 900 may be executed by control circuitry of a data storage device, such as control circuitry 22 or 300, during a calibration process. Alternatively, the calibration process of method 900 may be executed on another calibration system of data storage device to characterize similar devices and then provided to production devices during manufacture and self-servo write. Method 900 generally involves writing servo patterns with various phase dither values, measuring signal-to-noise ratios (SNR), and determining optimal phase offset values for different radial positions. By performing these steps, method 900 may enable the creation of a calibrated set of phase offset values that can be used to improve servo performance across the entire storage medium surface.

At block 910, a reader-to-writer offset may be determined. For example, the control circuitry may be provided with or calculate the physical offset between the read and write elements on the head to account for this difference in subsequent calculations.

At block 912, a radial position may be selected. For example, the control circuitry may choose a specific distance from the ID or OD on the disk surface to begin the calibration process.

At block 914, a servo track may be written. For example, the servo write logic may write a test servo pattern at the selected radial position using nominal timing.

At block 916, a stitched track may be written with a phase dither value. For example, the servo write logic may write a second servo pattern offset by half a track, applying a small phase adjustment to second halftrack pass.

At block 918, the pattern may be trimmed. For example, the control circuitry may perform a trim operation to remove the portion of the burst that would overlap the next track.

At block 920, full rate and half rate SNR measurements may be taken. For example, the read/write channel may read back the written patterns and calculate SNR values at both the full-rate and half-rate of the servo pattern.

At block 922, a phase offset range may be determined. For example, the control circuitry may set minimum and maximum phase offset values based on system capabilities and desired performance targets.

At block 924, a phase offset increment may be determined. For example, the control circuitry may choose a step size for adjusting the phase dither value between iterations, which may be based on the phase increments supported by the read/write channel and field-based phase adjustment features.

At block 926, the next phase dither value may be selected. For example, the control circuitry may increment the phase dither value by the determined step size for the next iteration of servo pattern writing and return to block 914 for a next iteration. An erase operation (not shown) may be performed between each change of dither value.

At block 928, SNR values for a sweep of phase dither values may be compared. For example, the control circuitry may analyze the collected SNR data for all tested phase dither values at the current radial position.

At block 930, a phase offset value for peak SNR may be determined for the radial position. For example, the control circuitry may identify the phase dither value that produced a target SNR, such as the highest SNR or SNR over a predefined threshold, and store this as the optimal phase offset for the current radial position. Method 900 may return to block 912 to select a next radial position on the storage medium.

At block 932, a calibrated set of phase offset values by radial position may be determined. For example, after completing the process for all desired radial positions, the control circuitry may compile the optimal phase offset values into a lookup table or function for use during normal servo writing operations for that data storage device and/or a similar population of storage devices.

Figure 9B:
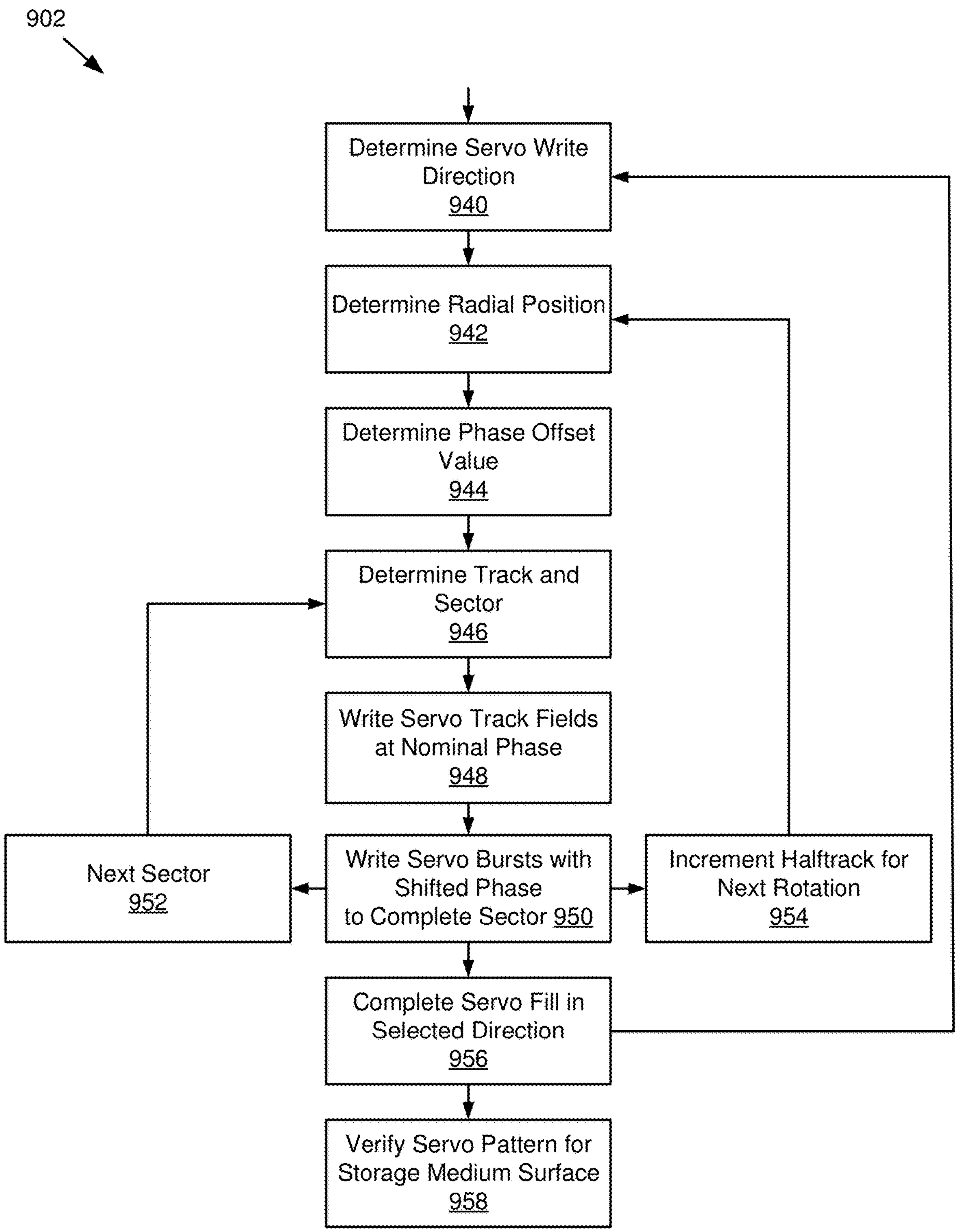
FIG. 9B is an example method of writing the servo pattern to the surface of the storage medium using the calibrated phase offset values.

FIG. 9B illustrates a flowchart of a method 902 for servo writing with phase adjustment. The method 902 may be executed by control circuitry of a data storage device, such as control circuitry 22 or 300. The method 902 generally involves determining servo write parameters, writing servo sectors with phase-adjusted bursts, and verifying the written servo pattern. By performing these steps, the method 902 may enable the creation of a high-quality servo pattern with improved signal-to-noise ratio and positioning accuracy across the entire storage medium surface. In some configurations, method 902 may be executed following method 900 during a self-servo writing process.

At block 940, servo write direction may be determined. For example, the control circuitry may decide whether to write servo patterns from the inner diameter to the middle diameter or vice versa based on the drive's configuration and butterfly servo write operations.

At block 942, radial position may be determined. For example, the control circuitry may identify the current distance from the ID or OD where servo writing will begin or continue.

At block 944, a phase offset value may be determined. For example, the control circuitry may retrieve the appropriate phase offset value from a calibrated lookup table based on the current radial position.

At block 946, track and sector information may be determined. For example, the servo write logic may calculate the specific track number and sector number for the servo pattern to be written.

At block 948, servo track fields may be written at nominal phase. For example, the servo write logic may write the preamble, SAM, and Gray code fields of the servo sector using the nominal clock phase.

At block 950, servo bursts may be written with shifted phase to complete the servo sector data pattern. For example, the servo write logic may write the position error signal bursts using the determined phase offset value in positive and negative directions to improve burst alignment and signal quality.

At block 952, the process may move to the next sector. For example, the control circuitry may increment the sector counter and prepare to write the next servo sector in the down track direction on the current track as the disk rotates. Method 902 may return to block 946 for the next servo sector.

At block 954, halftrack may be incremented for the next rotation. For example, the control circuitry may adjust the head position by half a track width to write the next set of servo bursts for creating stitched burst patterns. Method 902 may return to block 942 as the process moves from track-to-track during the servo writing operations.

At block 956, servo fill may be completed in the selected direction. For example, the control circuitry may continue writing servo sectors across all tracks in the chosen direction until the portion of the surface being written is covered. Method 902 may return to block 940 to continue the servo writing process in the opposite direction for the remaining portion of the disk surface.

At block 958, the servo pattern may be verified for the storage medium surface. For example, the control circuitry may perform a read-back and analysis of the written servo patterns to ensure proper placement, phase adjustment, and overall quality of the servo information.

Technology for servo formats based on servo sectors with phase shifted servo bursts relative to the preamble, SAM, and Gray code portion of each servo sector is described above. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to particular hardware.

Reference in the specification to "one embodiment" or "an embodiment" means that a particular feature, structure, or characteristic described in connection with the embodiment is included in at least one embodiment or implementation of the disclosed technologies. The appearances of the phrase "in one embodiment" in various places in the specification are not necessarily all referring to the same embodiment or implementation.

Some portions of the detailed descriptions above may be presented in terms of processes and symbolic representations of operations on data bits within a computer memory. A process can generally be considered a self-consistent sequence of operations leading to a result. The operations may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), erasable programmable read-only memories (EPROMs), electrically erasable programmable read-only memories (EEPROMs), magnetic or optical cards, flash memories including universal serial bus (USB) keys with non-volatile memory or any type of media suitable for storing electronic instructions, each coupled to a computer system bus.

The disclosed technologies can take the form of an entire hardware implementation, an entire software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The terms storage media, storage device, and data blocks are used interchangeably throughout the present disclosure to refer to the physical media upon which the data is stored.

Finally, the processes and displays presented herein may not be inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A data storage device, comprising:

a storage medium comprising a plurality of angularly spaced servo sectors defining a plurality of servo tracks and corresponding data sectors between consecutive servo sectors, wherein each servo sector is comprised of servo patterns corresponding to different servo tracks and comprising:

a first portion written with a first phase; and a set of position error bursts written with at least one second phase that is offset from the first phase by a phase offset value, wherein the phase offset value is a fractional offset of a cycle time of the servo patterns that is less than half of the cycle time.

2. The data storage device of claim 1, wherein:

the set of position error bursts comprises a first burst and a second burst;

the first burst is offset from the first phase in a first direction by the phase offset value; and the second burst is offset from the first phase in an opposite direction by the phase offset value.

3. The data storage device of claim 2, wherein:

the first portion and the set of position error bursts are written in multiple passes for each servo track of the plurality of servo tracks;

a burst pattern of the first burst and the second burst changes across each adjacent pass of the multiple passes; and the first direction and the opposite direction alternate across each adjacent pass of the multiple passes.

4. The data storage device of claim 3, wherein:

the burst pattern includes at least one stitched burst across each adjacent pass of the multiple passes; and a relative offset of bursts contributing to the at least one stitched burst aligns the at least one stitched burst to increase signal-to-noise ratio during readback for the at least one stitched burst relative to the set of position error bursts written at the first phase.

5. The data storage device of claim 1, further comprising:

control circuitry configured to:

determine the first phase;

determine the phase offset value;

generate write signal data for the first portion at the first phase;

generate write signal data for at least one burst of the set of position error bursts using the phase offset value; and send combined write signal data for the first portion and the set of position error bursts to a write circuit to write the servo pattern to the storage medium.

6. The data storage device of claim 1, further comprising:

control circuitry configured to:

determine the first phase based on a nominal clock signal from a first phase locked clock;

determine the phase offset value;

interpolate, for a first burst in the set of position error bursts, a delayed clock signal from the nominal clock signal with the phase offset value in a first direction;

interpolate, for a second burst in the set of position error bursts, an accelerated clock signal from the nominal clock signal with the phase offset value in an opposite direction to the first direction; and send, to a write circuit to write the servo pattern to the storage medium, write signal data for:

the first portion based on the nominal clock signal;

the first burst based on the delayed clock signal; and the second burst based on the accelerated clock signal.

7. The data storage device of claim 1, further comprising:

control circuitry configured to:

determine the first phase based on a nominal clock signal from a first phase locked clock;

determine the phase offset value;

determine, for a first burst in the set of position error bursts, a delayed clock signal from a second phase locked clock configured to operate based on a phase shift equal to the phase offset value in a first direction;

determine, for a second burst in the set of position error bursts, an accelerated clock signal from a third phase locked clock configured to operate based on a phase shift equal to the phase offset value in an opposite direction to the first direction; and send, to a write circuit to write the servo pattern to the storage medium, write signal data for:

the first portion based on the nominal clock signal;

the first burst based on the delayed clock signal; and the second burst based on the accelerated clock signal.

8. The data storage device of claim 1, further comprising:

control circuitry configured to, during servo write operations, selectively apply the phase offset value to each burst in the set of position error bursts, wherein the control circuitry is configured for:

a range of phase offset values up to 1/16 of a cycle time of a write frequency for the servo sector; and an increment of phase offset values less than 1/128 of the cycle time.

9. The data storage device of claim 1, further comprising:

a head actuated over the storage medium for reading the plurality of angularly spaced servo sectors to generate a servo read signal; and control circuitry configured to position, responsive to the servo read signal, the head over the storage medium, wherein:

the control circuitry is configured with a plurality of phase offset values that vary across the plurality of servo tracks; and the phase offset value for a selected servo track corresponds to a radial position of the selected servo track.

10. A method comprising:

actuating, by a data storage device, a head over a storage medium for reading a plurality of servo tracks, wherein:

the storage medium comprises a plurality of angularly spaced servo sectors defining the plurality of servo tracks and corresponding data sectors between consecutive servo sectors;

each servo sector is comprised of servo patterns corresponding to different servo tracks and comprising:

a first portion written with a first phase; and a set of position error bursts written with at least one second phase that is offset from the first phase by a phase offset value;

the set of position error bursts comprises a first burst and a second burst;

the first burst is offset from the first phase in a first direction by the phase offset value; and the second burst is offset from the first phase in an opposite direction by the phase offset value:

reading, by the data storage device, the plurality of angularly spaced servo sectors;

determining, by the data storage device and based on a read signal from the set of position error bursts, a position error signal; and positioning, by the data storage device, the head based on the position error signal.

11. The method of claim 10, wherein:

the first portion and the set of position error bursts are written in multiple passes for each servo track of the plurality of servo tracks;

a burst pattern of the first burst and the second burst changes across each adjacent pass of the multiple passes; and the first direction and the opposite direction alternate across each adjacent pass of the multiple passes.

12. The method of claim 11, wherein:

the burst pattern includes at least one stitched burst across each adjacent pass of the multiple passes; and a relative offset of bursts contributing to the at least one stitched burst aligns the at least one stitched burst to increase signal-to-noise ratio during readback for the at least one stitched burst relative to the set of position error bursts written at the first phase.

13. The method of claim 10, further comprising, during servo write operations:

determining, by the data storage device, the first phase;

determining, by the data storage device, the phase offset value;

generating, by the data storage device, write signal data for the first portion at the first phase;

generating, by the data storage device, write signal data for at least one burst of the set of position error bursts using the phase offset value; and sending, by the data storage device, combined write signal data for the first portion and the set of position error bursts to a write circuit to write the servo pattern to the storage medium.

14. The method of claim 10, further comprising, during servo write operations:

determining, by the data storage device, the first phase based on a nominal clock signal from a first phase locked clock;

determining, by the data storage device, the phase offset value;

interpolating, by the data storage device and for a first burst in the set of position error bursts, a delayed clock signal from the nominal clock signal with the phase offset value in a first direction;

interpolating, by the data storage device and for a second burst in the set of position error bursts, an accelerated clock signal from the nominal clock signal with the phase offset value in an opposite direction to the first direction; and sending, by the data storage device and to a write circuit to write the servo pattern to the storage medium, write signal data for:

the first portion based on the nominal clock signal;

the first burst based on the delayed clock signal; and the second burst based on the accelerated clock signal.

15. The method of claim 10, further comprising, during servo write operations:

determining, by the data storage device, the first phase based on a nominal clock signal from a first phase locked clock;

determining, by the data storage device, the phase offset value;

determining, by the data storage device and for a first burst in the set of position error bursts, a delayed clock signal from a second phase locked clock configured to operate based on a phase shift equal to the phase offset value in a first direction;

determining, by the data storage device and for a second burst in the set of position error bursts, an accelerated clock signal from a third phase locked clock configured to operate based on a phase shift equal to the phase offset value in an opposite direction to the first direction; and sending, by the data storage device and to a write circuit to write the servo pattern to the storage medium, write signal data for:

the first portion based on the nominal clock signal;

the first burst based on the delayed clock signal; and the second burst based on the accelerated clock signal.

16. The method of claim 10, further comprising, during servo write operations:

selectively applying, by the data storage device, the phase offset value to each burst in the set of position error bursts, wherein control circuitry of the data storage device is configured for:

a range of phase offset values up to 1/16 of a cycle time of a write frequency for the servo sector; and an increment of phase offset values less than 1/128 of the cycle time.

17. The method of claim 10, further comprising:

calibrating a plurality of phase offset values that vary across the plurality of servo tracks based on:

a reader to writer offset;

a radial position of a selected servo track; and a target signal-to-noise ratio value;

determining, by the data storage device, the phase offset value for the selected servo track from the plurality of phase offset values based on the radial position of the selected servo track; and writing, by the data storage device, the plurality of angularly spaced servo sectors for the selected servo track using the determined phase offset value for the set of position error bursts.

18. A data storage device comprising:

a storage medium comprising a plurality of servo tracks defined by a plurality of angularly spaced servo sectors;

a head actuated over the storage medium for reading the plurality of angularly spaced servo sectors from the storage medium to generate a servo read signal;

means for determining, from a plurality of phase offset values based on a radial position of a selected servo track, a phase offset value for each selected servo track of the plurality of servo tracks; and means for positioning, responsive to the servo read signal, the head over the storage medium, wherein each servo sector is comprised of servo patterns corresponding to each selected servo track and comprising:

a first portion written with a first phase; and a set of position error bursts written with at least one second phase that is offset from the first phase by the determined phase offset value for that selected servo track.

19. The data storage device of claim 18, wherein the phase offset value is a fractional offset of a cycle time of the servo patterns that is less than half of the cycle time.

20. The data storage device of claim 18, wherein:

the set of position error bursts comprises a first burst and a second burst;

the first burst is offset from the first phase in a first direction by the phase offset value; and the second burst is offset from the first phase in an opposite direction by the phase offset value.

21. A method comprising, during servo write operations:

actuating, by a data storage device, a head over a storage medium for writing a plurality of servo tracks, wherein:

the plurality of servo tracks is defined by a plurality of angularly spaced servo sectors and corresponding data sectors between consecutive servo sectors; and each servo sector is comprised of servo patterns corresponding to different servo tracks;

determining, by the data storage device and for each servo pattern, a first phase;

determining, by the data storage device and for each servo pattern, a phase offset value;

generating, by the data storage device and for each servo sector, write signal data for a first portion of that servo pattern at the first phase;

generating, by the data storage device and for each servo pattern, write signal data for at least one burst of a set of position error bursts for that servo pattern using the phase offset value; and sending, by the data storage device, combined write signal data for the first portion and the set of position error bursts to a write circuit to write the servo pattern to the storage medium.

22. A method comprising, during servo write operations:

actuating, by a data storage device, a head over a storage medium for writing a plurality of servo tracks, wherein:

the plurality of servo tracks is defined by a plurality of angularly spaced servo sectors and corresponding data sectors between consecutive servo sectors; and each servo sector is comprised of servo patterns corresponding to different servo tracks;

determining, by the data storage device and for each servo pattern, a first phase based on a nominal clock signal from a first phase locked clock;

determining, by the data storage device and for each servo pattern, a phase offset value;

interpolating, by the data storage device and for a first burst in a set of position error bursts for each servo pattern, a delayed clock signal from the nominal clock signal with the phase offset value in a first direction;

interpolating, by the data storage device and for a second burst in the set of position error bursts for each servo pattern, an accelerated clock signal from the nominal clock signal with the phase offset value in an opposite direction to the first direction; and sending, by the data storage device and to a write circuit to write each servo pattern to the storage medium, write signal data for:

a first portion of that servo pattern based on the nominal clock signal;

the first burst based on the delayed clock signal; and the second burst based on the accelerated clock signal.

23. A method comprising, during servo write operations:

actuating, by a data storage device, a head over a storage medium for writing a plurality of servo tracks, wherein:

the plurality of servo tracks is defined by a plurality of angularly spaced servo sectors and corresponding data sectors between consecutive servo sectors; and each servo sector is comprised of servo patterns corresponding to different servo tracks;

determining, by the data storage device and for each servo pattern, a first phase based on a nominal clock signal from a first phase locked clock;

determining, by the data storage device and for each servo pattern, a phase offset value;

determining, by the data storage device and for a first burst in a set of position error bursts for each servo pattern, a delayed clock signal from a second phase locked clock configured to operate based on a phase shift equal to the phase offset value in a first direction;

determining, by the data storage device and for a second burst in the set of position error bursts for each servo pattern, an accelerated clock signal from a third phase locked clock configured to operate based on a phase shift equal to the phase offset value in an opposite direction to the first direction; and sending, by the data storage device and to a write circuit to write each servo pattern to the storage medium, write signal data for:

a first portion of that servo pattern based on the nominal clock signal;

the first burst based on the delayed clock signal; and the second burst based on the accelerated clock signal.

* * * * *